(12) United States Patent
Faifer

(10) Patent No.: US 9,255,749 B2
(45) Date of Patent: Feb. 9, 2016

(54) AMMUNITION MAGAZINE AND RESILIENT MEMBER

(71) Applicant: Sagi Faifer, Mishmar Hashiva (IL)

(72) Inventor: Sagi Faifer, Mishmar Hashiva (IL)

(*) Notice: Subject to any disclaimer, the term of this patent is extended or adjusted under 35 U.S.C. 154(b) by 0 days.

(21) Appl. No.: 14/147,562

(22) Filed: Jan. 5, 2014

(65) Prior Publication Data

US 2015/0121736 A1 May 7, 2015

Related U.S. Application Data

(63) Continuation-in-part of application No. 29/472,057, filed on Nov. 7, 2013, now Pat. No. Des. 735,831.

(60) Provisional application No. 61/912,521, filed on Dec. 5, 2013.

(51) Int. Cl.
*F41A 9/65* (2006.01)
*F41A 9/70* (2006.01)
*F16F 1/04* (2006.01)

(52) U.S. Cl.
CPC . *F41A 9/70* (2013.01); *F16F 1/047* (2013.01); *F41A 9/65* (2013.01)

(58) Field of Classification Search
USPC .................................. 42/49.01, 50
See application file for complete search history.

(56) References Cited

U.S. PATENT DOCUMENTS

| 254,453 | A |   | 3/1882  | Borchardt |          |
|---------|---|---|---------|-----------|----------|
| 283,122 | A |   | 8/1883  | Lewis     |          |
| 303,992 | A |   | 8/1884  | Diss      |          |
| 313,851 | A |   | 3/1885  | Cook      |          |
| 431,410 | A |   | 7/1890  | Speed     |          |
| 999,387 | A |   | 8/1911  | Mauser    |          |
| 1,129,884 | A |   | 3/1915  | Mauser    |          |
| 2,434,269 | A |   | 1/1948  | Harvey    |          |
| 2,476,232 | A | * | 7/1949  | Williams  | 89/182   |
| 2,507,364 | A |   | 5/1950  | Benson    |          |
| 2,715,789 | A |   | 8/1955  | Garand    |          |
| 2,765,561 | A | * | 10/1956 | Morris    | 42/69.01 |
| 2,795,880 | A |   | 6/1957  | Patchett  |          |
| 2,903,809 | A |   | 9/1959  | Stoner    |          |
| 3,191,332 | A |   | 6/1965  | Ardolino  |          |
| 3,399,480 | A |   | 9/1968  | Rowe, Jr. |          |
| 3,619,929 | A |   | 11/1971 | Fremont   |          |
| 3,732,643 | A |   | 5/1973  | Wells     |          |
| 3,736,686 | A |   | 6/1973  | Moller et al. |      |
| D244,285 | S |   | 5/1977  | Sofinowski |         |
| 4,107,862 | A |   | 8/1978  | Sofinowski, III |    |
| 4,127,954 | A |   | 12/1978 | Hausmann  |          |
| 4,139,959 | A |   | 2/1979  | Howard et al. |      |
| 4,391,055 | A |   | 7/1983  | Kadim     |          |
| 4,408,409 | A |   | 10/1983 | Arias     |          |

(Continued)

*Primary Examiner* — Michael David
(74) *Attorney, Agent, or Firm* — Law Office of Arthur M. Antonelli, PLLC

(57) ABSTRACT

A magazine for storing and feeding ammunition cartridges to a small arms weapon which comprises a casing, a floor plate, a follower, and a magazine spring inside the casing. The magazine spring may comprise a first end connected to the follower, a second end connected to the floor plate, and a plurality of coils. Each of the plurality of coils may include a first segment having a first radius, a second segment having a first length adjoining the first segment, a third segment having a second radius adjoining the second segment, the second radius being greater than the first radius, and a fourth segment having a second length adjoining the third segment, the second length being approximately equal to the first length.

20 Claims, 27 Drawing Sheets

(56) References Cited

U.S. PATENT DOCUMENTS

| | | |
|---|---|---|
| 4,413,437 A | 11/1983 | Anderson |
| 4,428,137 A | 1/1984 | Johnson |
| 4,586,281 A | 5/1986 | Chesnut |
| 4,587,756 A | 5/1986 | Jakubaschk et al. |
| 4,589,218 A | 5/1986 | Teppa |
| 4,831,761 A | 5/1989 | Kulakow |
| 5,014,456 A | 5/1991 | Kurtz et al. |
| 5,099,595 A | 3/1992 | Chesnut et al. |
| 5,113,605 A | 5/1992 | Kim |
| 5,149,897 A | 9/1992 | Howard |
| 5,153,359 A | 10/1992 | Lishness |
| 5,206,444 A | 4/1993 | Oliver |
| 5,279,059 A | 1/1994 | Howard |
| 5,287,720 A | 2/1994 | Lishness |
| 5,291,679 A | 3/1994 | Wollack et al. |
| 5,309,660 A | 5/1994 | Blackamore |
| 5,329,718 A | 7/1994 | Howard |
| 5,345,660 A | 9/1994 | Howard |
| 5,386,657 A | 2/1995 | Racheli |
| 5,388,360 A | 2/1995 | Fortunato |
| 5,438,783 A | 8/1995 | Sniezak et al. |
| 5,461,811 A | 10/1995 | Ciener |
| 5,507,110 A | 4/1996 | Chesnut et al. |
| 5,526,600 A | 6/1996 | Chesnut et al. |
| 5,561,933 A | 10/1996 | Czekalski |
| 5,588,241 A | 12/1996 | Hurley |
| 5,615,505 A | 4/1997 | Vaid |
| 5,638,626 A | 6/1997 | Westrom |
| 5,642,581 A | 7/1997 | Herold et al. |
| 5,697,179 A | 12/1997 | Vanmoor |
| 5,755,052 A | 5/1998 | Keeney |
| 5,761,841 A | 6/1998 | Snick |
| 5,956,787 A | 9/1999 | Yang |
| 6,606,811 B1 | 8/2003 | Olson |
| 6,739,082 B2 | 5/2004 | Christensen |
| 6,748,689 B2 | 6/2004 | Fitzpatrick |
| 6,829,855 B2 | 12/2004 | Seifert |
| 6,883,261 B2 | 4/2005 | Fitzpatrick |
| 7,200,964 B2 | 4/2007 | Gates |
| 7,237,354 B1 | 7/2007 | Conner |
| 7,318,294 B2 | 1/2008 | Zimmermann |
| 7,398,615 B2 | 7/2008 | Wheatley |
| 7,441,491 B2 | 10/2008 | Snow |
| 7,533,483 B1 | 5/2009 | Alzamora et al. |
| 7,536,816 B2 | 5/2009 | Weinberger |
| 7,621,063 B2 | 11/2009 | Fitzpatrick et al. |
| 7,698,844 B2 | 4/2010 | Gruber et al. |
| 7,765,997 B2 | 8/2010 | Klockener et al. |
| 7,823,312 B2* | 11/2010 | Faifer ............ 42/49.02 |
| 7,908,780 B2 | 3/2011 | Fitzpatrick et al. |
| 7,937,872 B1 | 5/2011 | Fluhr |
| 7,958,660 B2 | 6/2011 | Fitzpatrick et al. |
| 8,006,423 B1 | 8/2011 | Alzamora et al. |
| 8,021,208 B2 | 9/2011 | Victor |
| 8,042,297 B2 | 10/2011 | Emde |
| 8,069,601 B1 | 12/2011 | Fitzpatrick et al. |
| 8,166,692 B2 | 5/2012 | Fitzpatrick et al. |
| 8,196,327 B2 | 6/2012 | Rich |
| 8,347,774 B2 | 1/2013 | Rich |
| 8,356,439 B2 | 1/2013 | Dubois |
| 8,356,440 B2 | 1/2013 | Troy |
| 8,407,922 B1 | 4/2013 | Taylor |
| 8,434,254 B1 | 5/2013 | Watchorn et al. |
| 8,448,364 B2 | 5/2013 | Davidson |
| 8,468,730 B2* | 6/2013 | Faifer et al. ............ 42/50 |
| 8,468,734 B2* | 6/2013 | Meller et al. ............ 42/90 |
| 8,484,875 B2 | 7/2013 | Heath |
| 8,572,877 B2 | 11/2013 | Sullivan |
| 8,590,202 B2 | 11/2013 | Keng |
| 8,590,203 B1 | 11/2013 | McCarthy et al. |
| 8,607,489 B1 | 12/2013 | Calvert |
| 8,635,796 B2 | 1/2014 | Fitzpatrick et al. |
| 8,667,724 B2 | 3/2014 | Zheng |
| 2010/0154275 A1* | 6/2010 | Faifer ............ 42/90 |
| 2011/0167695 A1* | 7/2011 | Faifer et al. ............ 42/50 |
| 2012/0198744 A1* | 8/2012 | Meller et al. ............ 42/90 |
| 2014/0196340 A1* | 7/2014 | Dugger ............ 42/49.01 |
| 2014/0373415 A1* | 12/2014 | Faifer ............ 42/49.01 |

* cited by examiner

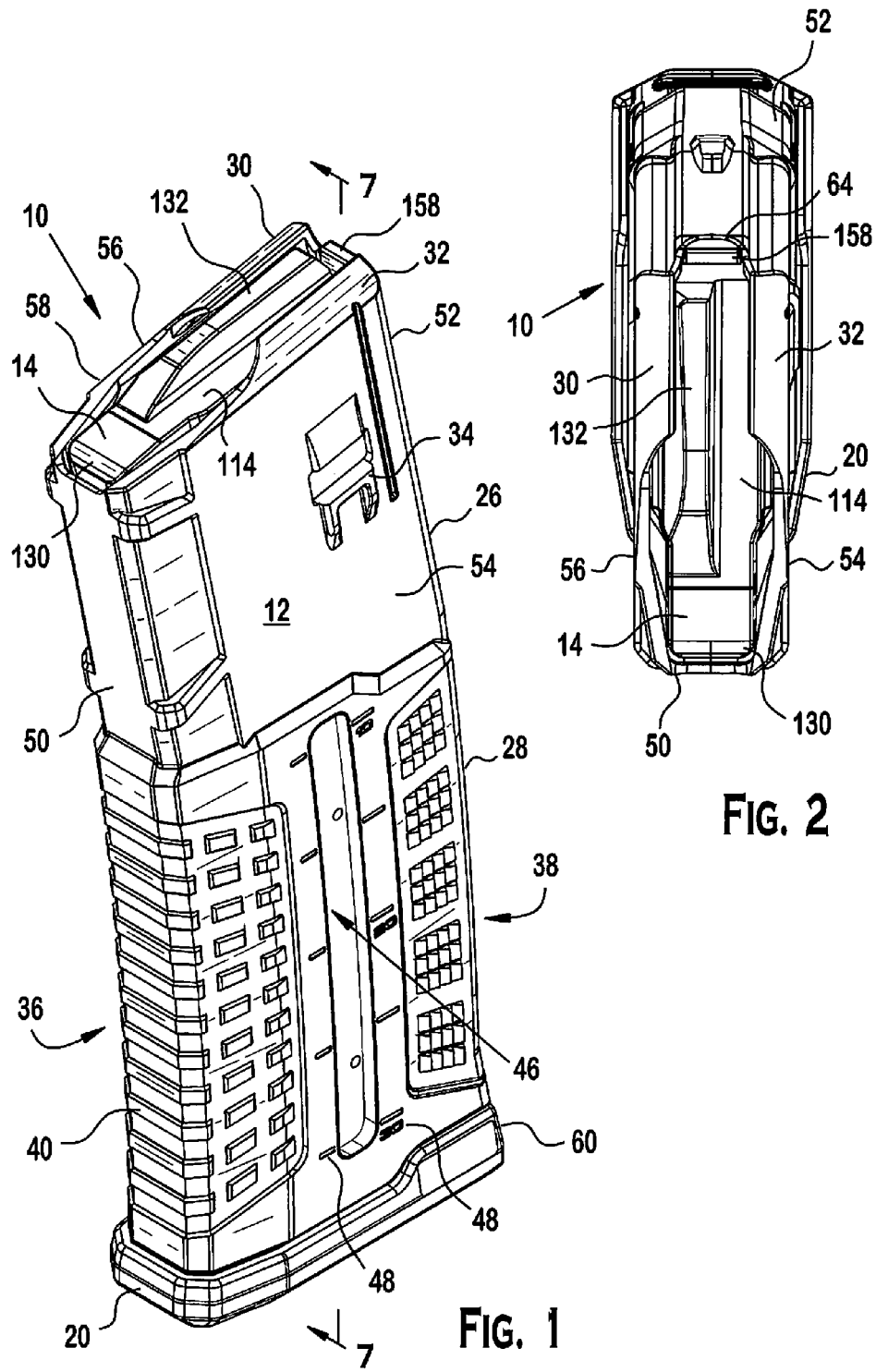

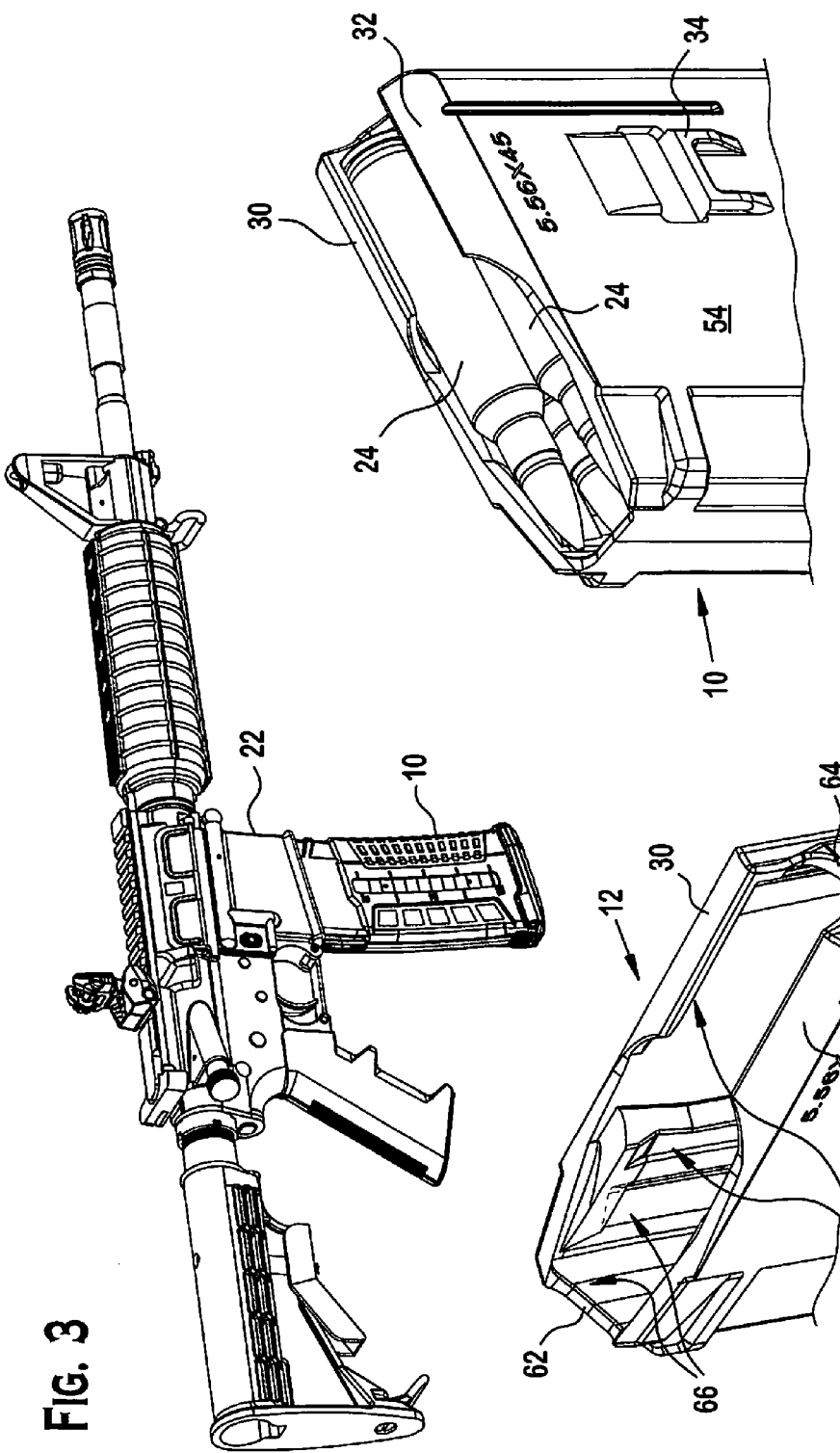

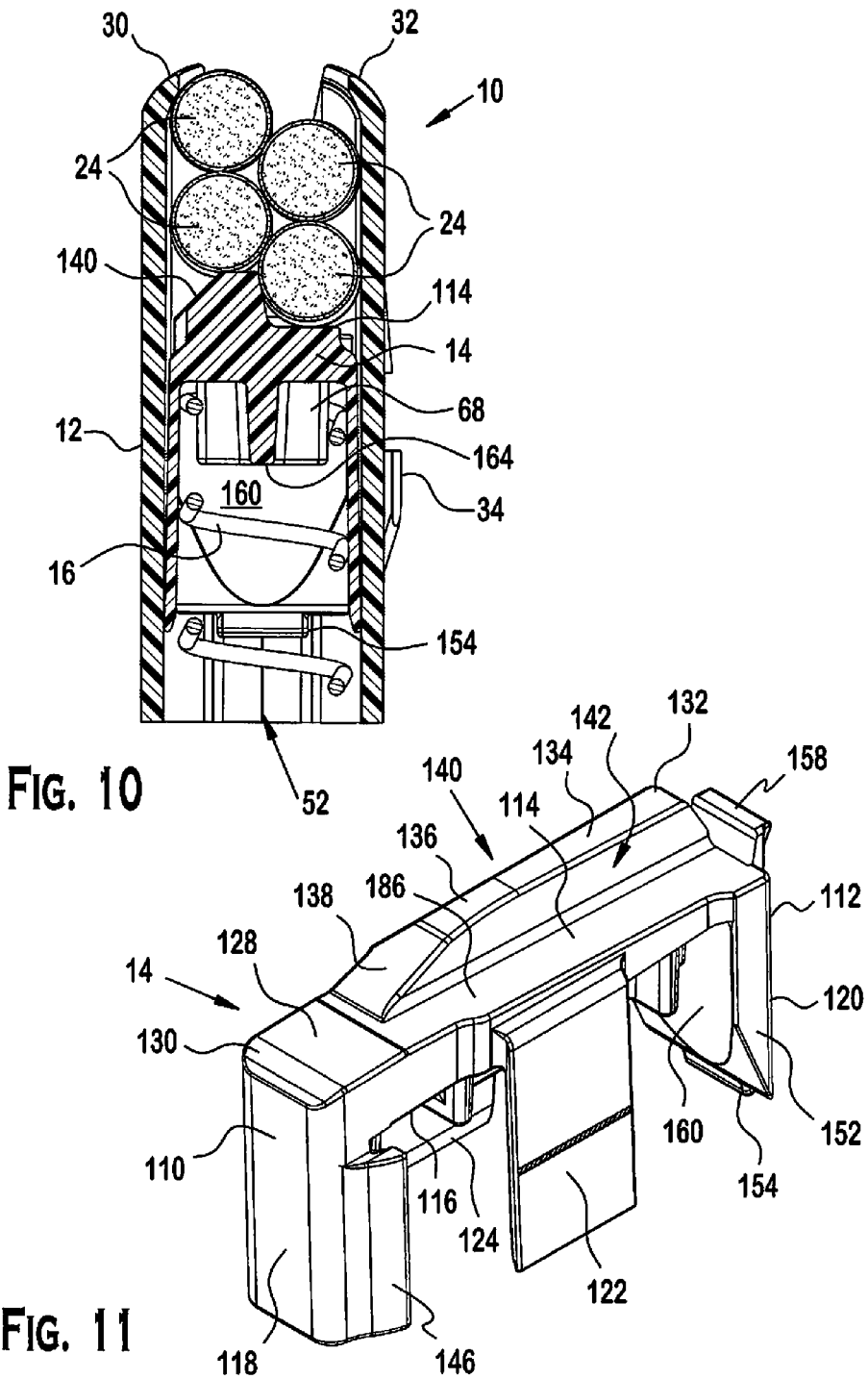

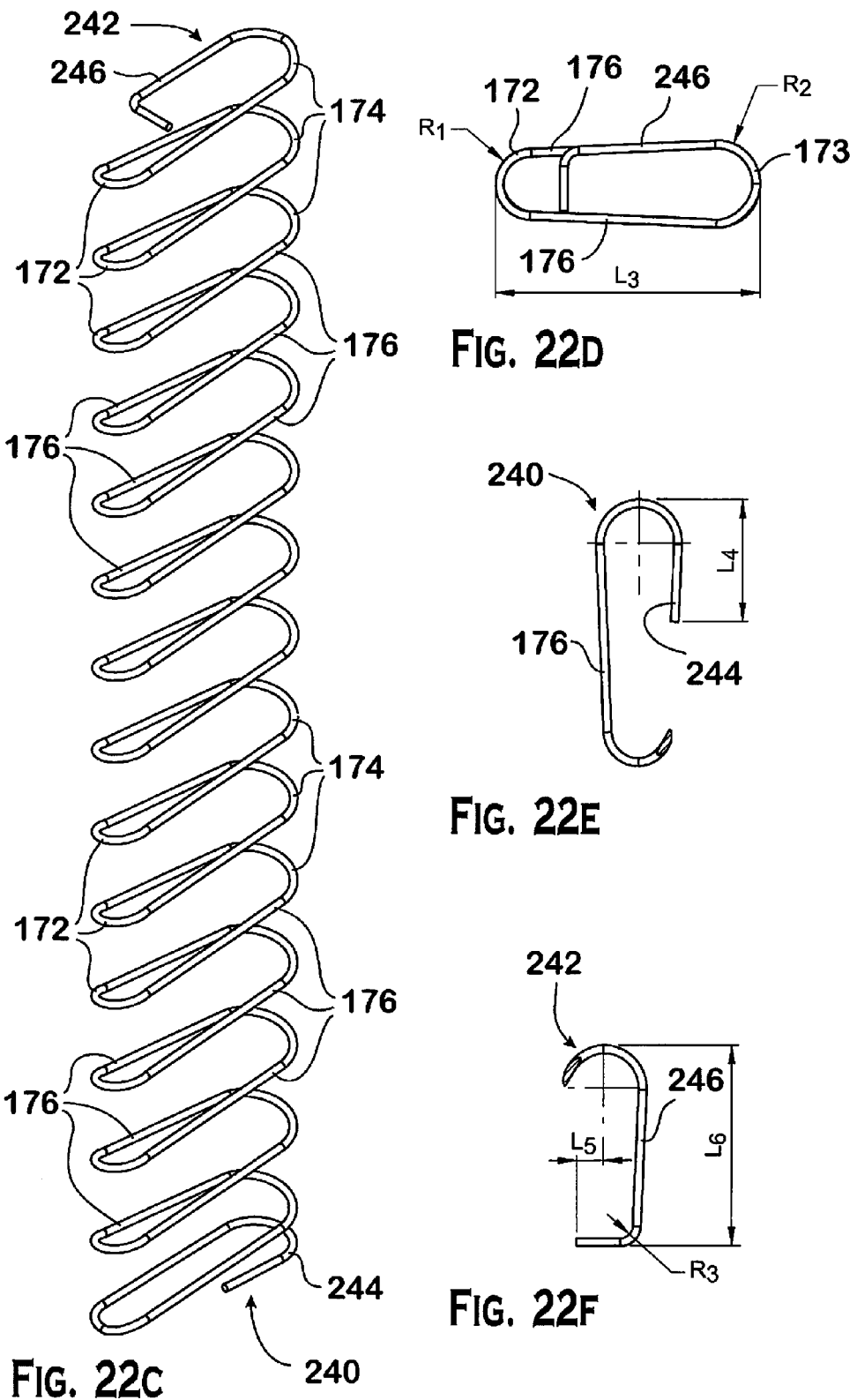

AMMUNITION MAGAZINE AND RESILIENT MEMBER

CROSS REFERENCE TO RELATED APPLICATIONS

This application is a continuation-in-part of application No. 29/472,057 filed Nov. 7, 2013. This application claims the benefit of provisional Application No. 61/912,521 filed Dec. 5, 2013. The disclosure of each of these applications is incorporated by reference herein in their entirety.

FIELD OF THE INVENTION

The present invention generally relates to a method for storing and feeding ammunition cartridges to a small arms weapon. More particularly, this invention relates to an ammunition magazine for a small arms weapon. This invention also relates to a resilient biasing member for moving ammunition cartridges through a magazine.

BACKGROUND

Reliable delivery of ammunition from an external supply into a firearm chamber is an important aspect of effective firearm operations. The structure and capacity of the external supply of ammunition may affect the consistency of ammunition delivery. Additionally, the ability of the external supply to be detached from the firearm, reloaded with ammunition, and then reused with the firearm may enhance the effectiveness of firearm operations. Although ammunition magazines (e.g., STANAG or STANAG-compatible box magazines) are known, some ammunition magazines may lack durability or tend to malfunction. Accordingly, a need exists for new ammunition storage and feeding devices.

SUMMARY

Hence, the present invention is directed to an ammunition magazine for storing and feeding ammunition cartridges to a firearm. The present invention is also directed to a magazine spring.

One aspect of the present invention relates to a magazine for storing and feeding ammunition cartridges to a small arms weapon. The magazine may include a casing which comprises an upper end and a lower end, a floor plate situated near the lower end, a follower adjacent the floor plate, and a magazine spring inside the casing. The magazine spring may comprise a first end connected to the follower, a second end connected to the floor plate, and a plurality of coils. Each of the plurality of coils may include a first segment having a first radius, a second segment having a first length adjoining the first segment, a third segment having a second radius adjoining the second segment, the second radius being greater than the first radius, and a fourth segment having a second length adjoining the third segment, the second length being approximately equal to the first length. The second radius divided by the first radius may define a coil ratio. Preferably, the coil ratio may be between approximately 1.1 and approximately 1.5.

In another aspect, the magazine spring may be preloaded for a force of approximately 15 N at a reference length of approximately 180 mm. The magazine spring further may have a solid height that is less than or equal to approximately 25 mm. Moreover, the second radius may be approximately 8.1 mm and the first radius may be approximately 6.5 mm. The magazine spring may be formed from a round wire. The round wire may have an outer diameter of approximately 1.5 mm and may be music wire per ASTM A228.

In another aspect, the magazine spring may be preloaded for a force of approximately 15 N at a reference length of approximately 75 mm. The magazine spring may have a solid height less than or equal to approximately 20 mm. The second radius may be approximately 8.1 mm and the first radius may be approximately 6.1 mm. The magazine spring may be formed from a round wire. The round wire may have an outer diameter of approximately 1.5 mm and may be music wire per ASTM A228

In another aspect, the magazine casing may be configured and dimensioned to store a plurality of ammunition cartridges for a small arms weapon. For example, the casing may be configured and dimensioned to store 30 or fewer ammunition cartridges. In another example, the casing may be configured and dimensioned to store 10 or fewer ammunition cartridges. The casing may be configured and dimensioned to store 5.56× 45 mm NATO cartridges or .223 Remington cartridges.

Another aspect of the present invention relates to a magazine spring for an ammunition magazine for a small arms weapon. The magazine spring may include a wire which comprises a plurality of coils. Each of the plurality of coils may include a first segment having a first radius, a second segment having a first length adjoining the first segment, a third segment having a second radius adjoining the second segment, the second radius being greater than the first radius, and a fourth segment having a second length adjoining the third segment, the second length being approximately equal to the first length. The second radius further may be divided by the first radius to define a coil ratio, and the coil ratio may be at least about 1.05.

In another aspect, the coil ratio may be less than about 3. Preferably, the coil ratio may range from approximately 1.10 to approximately 1.50. More preferably, the coil ratio may range from approximately 1.20 to approximately 1.35. In an exemplary embodiment of the invention, the coil ratio is approximately 1.25. In another exemplary embodiment, the coil ratio is approximately 1.32.

In another aspect, the wire may have a preloaded force of approximately 15 N for a reference length that ranges from approximately 75 mm to approximately 180 mm.

In another aspect, the second radius may be between approximately 7.8 mm and 8.4 mm.

In a preferred embodiment, the first radius may be between approximately 5.8 mm and approximately 6.4 mm.

In another preferred embodiment, the first radius may be between approximately 6.2 mm and approximately 6.4 mm.

In another aspect, each of the plurality of coils may have a maximum outer dimension between approximately 49.2 mm and approximately 49.8 mm.

In another aspect, the wire may be a round wire, a stranded wire, or a shaped wire. The shaped wire may be is selected from one of the group consisting of square, rectangular, keystone, oval, elliptical, half round, or D-shaped.

In another aspect, the wire may be carbon steel. For example, the wire may be music wire.

In another aspect, the wire may be alloy steel. For example, the wire may be chrome silicon.

DESCRIPTION OF THE DRAWINGS

In the accompanying drawings, which form a part of the specification and are to be read in conjunction therewith and in which like reference numerals (or designations) are used to indicate like parts in the various views:

FIG. 1 is a perspective view of an exemplary embodiment of an ammunition magazine in accordance with the present invention;

FIG. 2 is top view of the magazine of FIG. 1;

FIG. 3 is a perspective view of the magazine of FIG. 1 loaded in an AR-15 type firearm;

FIG. 4 is another perspective view of the magazine of FIG. 1, the magazine being loaded with ammunition cartridges;

FIG. 5 is a partial perspective view of the casing of the magazine of FIG. 1;

FIG. 10 is a partial cross-sectional view of the magazine of FIG. 8, along line 10-10;

FIG. 11 is a perspective view of the follower of FIG. 1;

FIG. 22C is a perspective view of the magazine spring of FIG. 22A;

FIG. 22D is a top view of the magazine spring of FIG. 22A;

FIG. 22E is a cross-sectional view of the spring of FIG. 22A, along line 22E-22E;

FIG. 22F is a cross-sectional view of the spring of FIG. 22A, along line 22F-22F;

DESCRIPTION

Figure 6:
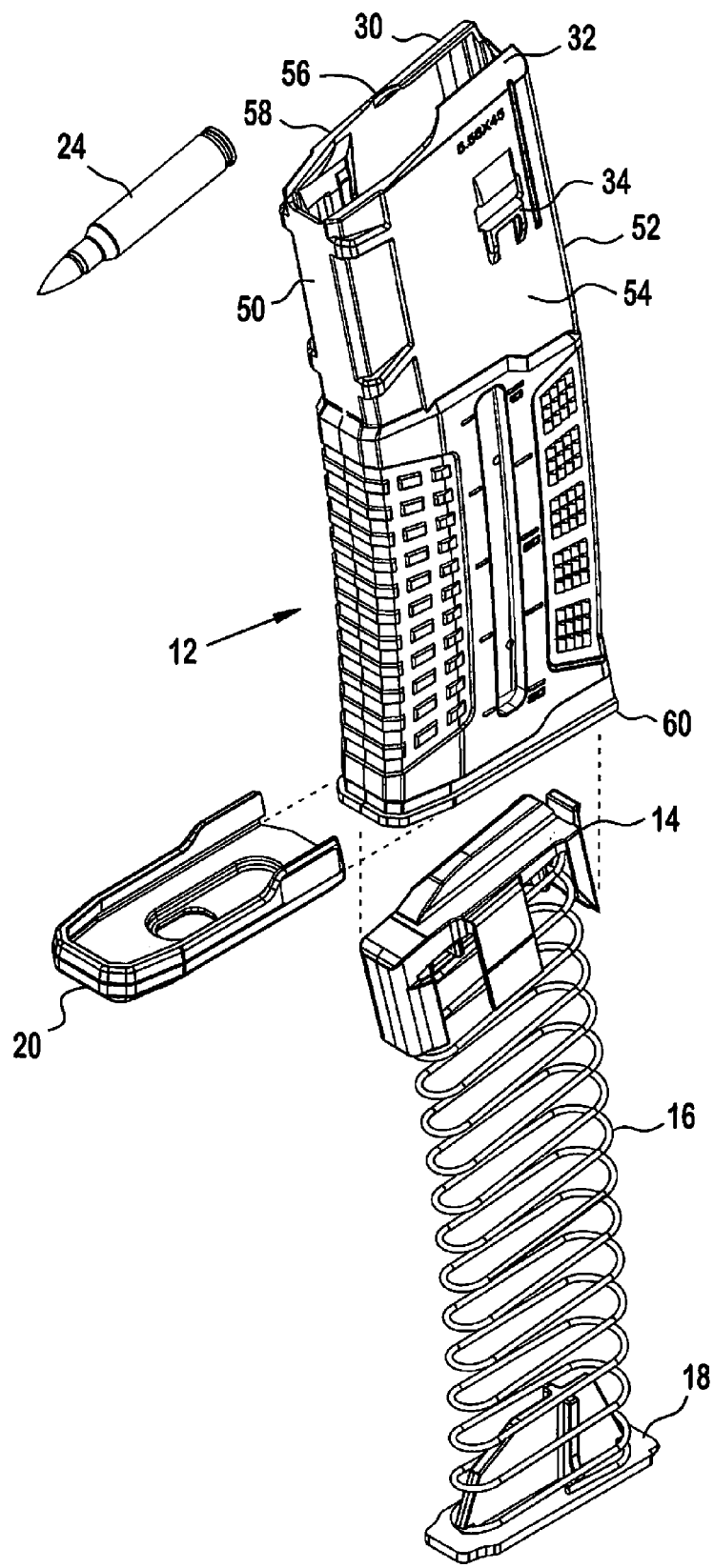
FIG. 6 is an exploded view of the magazine of FIG. 1, along with a cartridge that may be stored in the magazine.

FIGS. 1 and 2 show an exemplary embodiment of an ammunition magazine 10 of the present invention. As shown in FIG. 6, the magazine may include a housing 12, a follower 14, a spring 16, a floor plate 18 and a base 20. Referring to FIG. 3, the magazine 10 may be configured and dimensioned for use with an AR-15 rifle (or M-4 carbine) 22. Referring to FIG. 4, the magazine 10 may be used to store and feed up to thirty ammunition cartridges 24. Although the exemplary embodiment of the magazine is configured and dimensioned to store and feed NATO 5.56 mm cartridges or .223 Remington cartridges, other types of suitable ammunition cartridges may be used.

As shown in FIG. 1, the magazine may include an upper portion 26 which interfaces with the rifle and a lower portion 28 which is primarily handled by the user. The upper portion of the magazine may include a pair of magazine feed lips 30, 32. The magazine lips may be disposed in a contra-lateral configuration. The magazine lips may be configured and dimensioned to interface with a portion of a rifle bolt. Additionally, the upper portion may include a projection 34 that is configured and dimensioned to interlock with a magazine catch on the rifle. The magazine catch may interlock with the projection to selectively secure the magazine within the rifle.

The lower portion 28 of the magazine may include a fore grip 36 and a rear grip 38. The fore grip and/or the rear grip may include a region of raised features 40. The raised features may include a plurality of geometric shapes. For example, the fore grip may include a plurality of generally rectangular shaped projections 42 and the rear grip may include a plurality of generally triangular shaped projections 44. The projections may be arranged in one or more patterns to improve the ability of a user to hold and handle the magazine. Additionally, the lower portion of the magazine may include a window 46. The window may be disposed between the fore grip and the rear grip. The window may provide a user with a view of the magazine interior. For example, the window may provide a view of cartridges that are stored in the magazine.

The magazine may include indicia 48. The indicia may be associated with the window and may indicate the number of ammunition cartridges which are stored in the magazine. For example, the indicia may include tick marks and numbers. For instance, tick marks may be spaced on the magazine to designate storage intervals of five ammunition cartridges. Numerals may be placed by some or all of the tick marks to indicate the number of ammunition cartridges in the magazine. In FIG. 1, numerals are shown next to tick marks designating the 10, 20, and 30 ammunition cartridge storage interval marks.

As shown in FIGS. 1 and 6, the magazine housing 12 may include a front sidewall 50, a rear sidewall 52, a port sidewall 54 and a starboard sidewall 56. In the exemplary embodiment, the front side wall may conform to a first imaginary curve having a radius of approximately 750 mm, and the rear side wall may conform to a second imaginary curve having a radius of approximately 810 mm. The first center point and the second center point may define a vertical axis. The first center point may be situated above the second center point. For example, the center of the first imaginary curve may be disposed above the center of the second imaginary curve such that the internal distance between the front side wall and the rear side wall at the top of the magazine may be approximately 60.4 mm and the internal distance between the front side wall 50 and the rear sidewall 52 at the bottom of the casing may be approximately 61.3 mm. Accordingly, the distance separating the front side wall and the rear sidewall at the top of the housing is approximately 1 mm less than the distance separating the front sidewall and the rear sidewall at the bottom of the housing.

Referring to FIG. 5, the housing 12 may include a front sill 62, a rear sill 64, a starboard side magazine feed lip 30, a port side magazine feed lip 32, and internal guide surfaces 66, 68 for the follower and ammunition cartridges.

Figure 19:
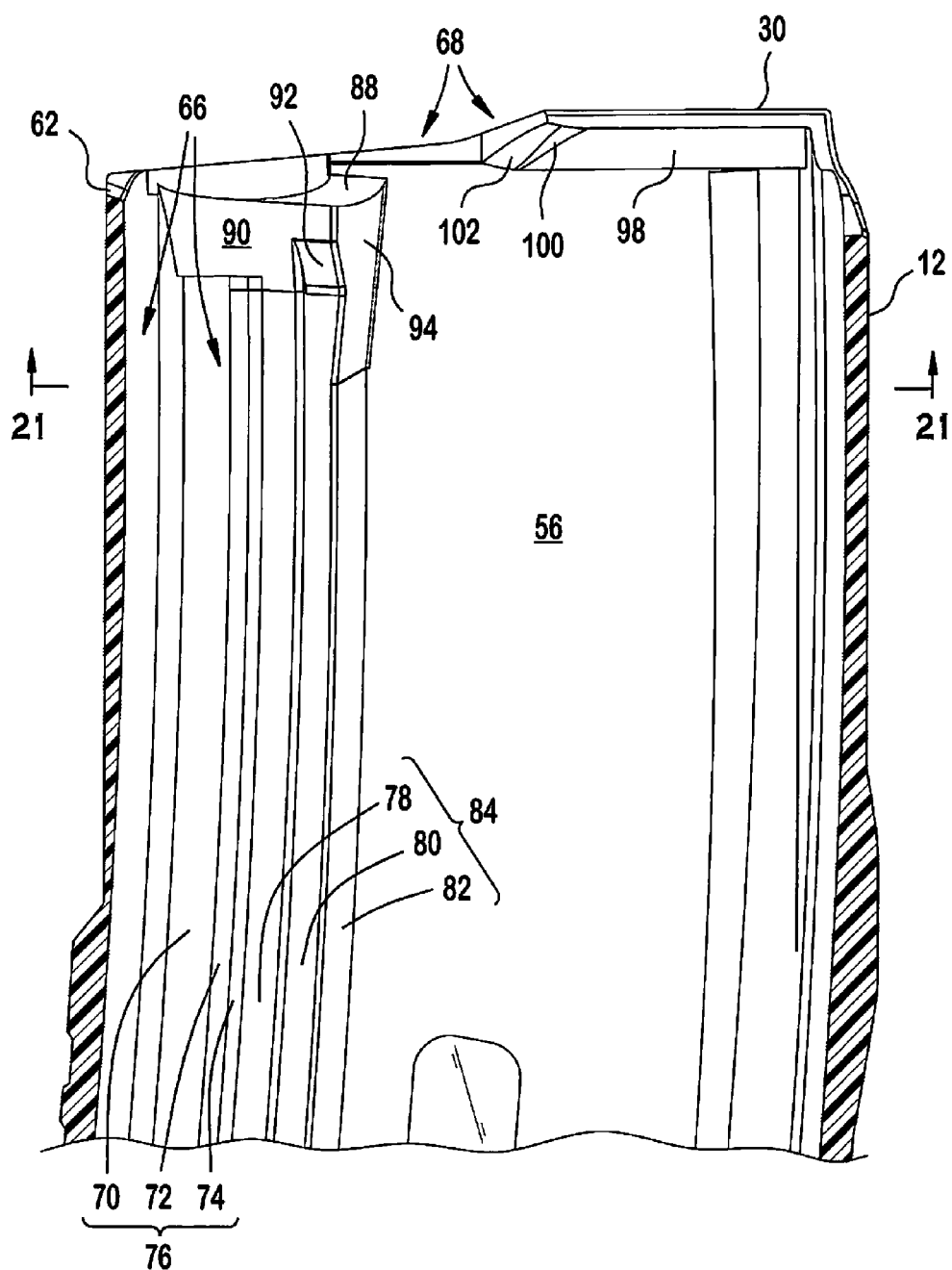
FIG. 19 is a partial cross-sectional perspective view of the magazine casing of FIG. 8.
Figure 21:
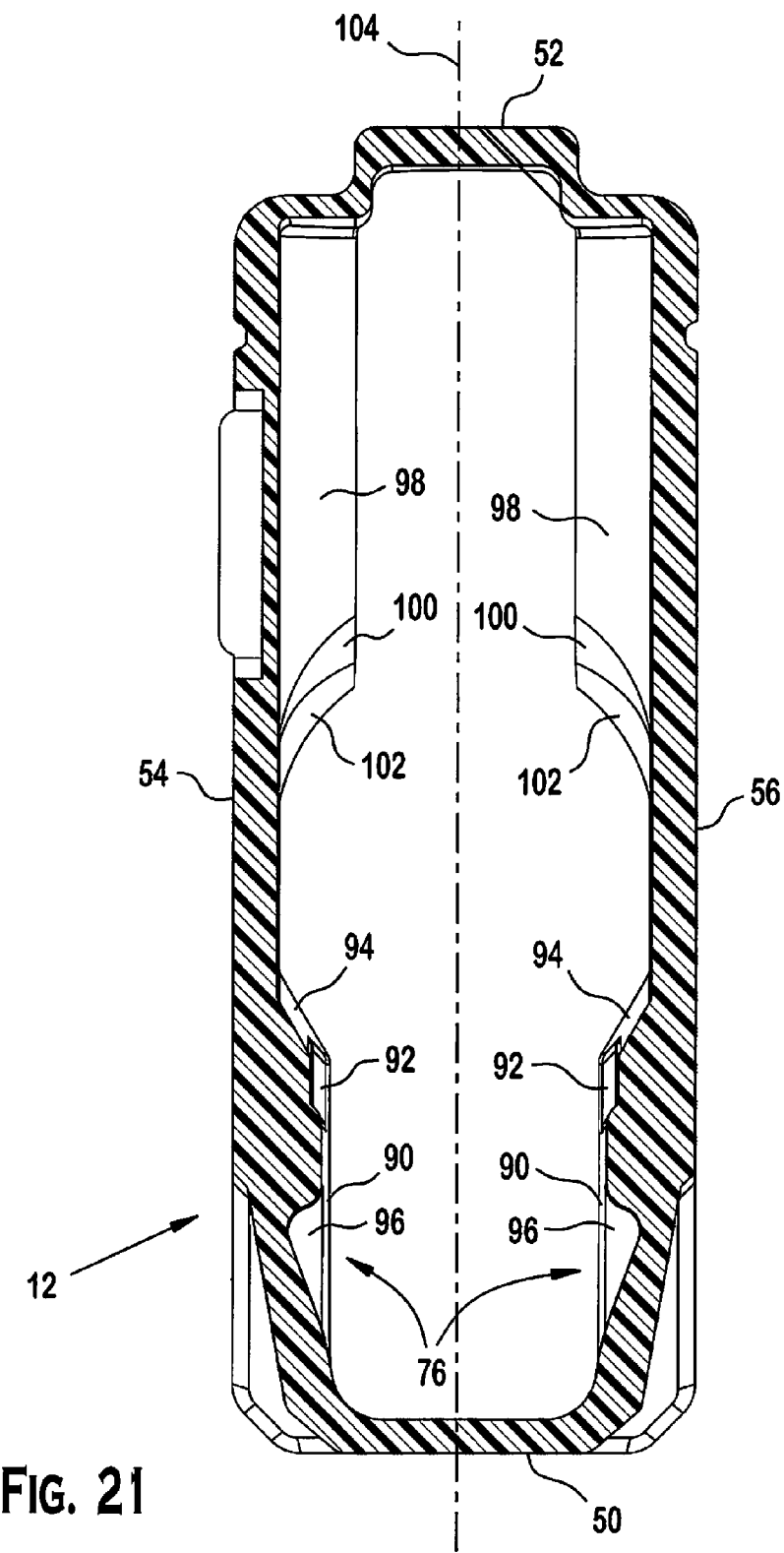
FIG. 21 is a cross-sectional view of the magazine casing of FIG. 19, along line 21-21.

As shown in FIGS. 19 and 21, the starboard side wall 30 may include guide surfaces 66, 68 for the follower and ammunition cartridges. The follower guide surfaces 66 may include a generally planar surface 70, a concave surface 72 abutting the generally planar surface, and a convex surface 74 abutting the concave surface. These surfaces may form a bumper track 76, which is configured and dimensioned to receive a portion of the follower. Accordingly, the starboard sidewall may include a bumper track 76 having a cross-sectional profile that includes a generally planar segment, a concave segment and a convex segment.

The ammunition cartridge guide surfaces 68 may include a projectile guide surface 78, a cartridge neck guide surface 80, and a cartridge shoulder guide surface 82. These surfaces 78, 80, 82 may form an ammunition cartridge track 84, which is configured and dimensioned to support a particular type of ammunition cartridge, such as a 5.56×45 mm NATO round. Accordingly, the starboard sidewall may include an ammunition cartridge track having a cross-sectional profile which, in part, resembles the contour of an ammunition cartridge.

The guide surfaces further may include a multi-faceted block 86, which projects from the starboard sidewall 56 near the top of the housing. The multi-faceted block 86 may intersect the follower and ammunition cartridge guide surfaces and may include: a tapered, concave upper surface 88; an angled and tapered side surface 90; an angled sub-side surface 92; and an angled and tapered rear surface 94. The multi-faceted block further may include a lower surface 96.

The tapered concave upper surface 88 may be configured and dimensioned to form a ramp for directing a forward moving ammunition cartridge upward and over the front sill 62 of the housing. The angled and tapered side surface 90 may be configured and dimensioned to push the projectile of an ammunition cartridge toward the center of the housing as the cartridge moves up the face of the angled and tapered side surface 90.

The angled sub-surface 92 may form a ramp which connects the angled and tapered side surface 90 and the cartridge neck guide surface 80. The angled sub-side surface 92 may be configured and dimensioned to push the cartridge neck of an ammunition cartridge toward the center of the housing as the cartridge moves up the face of the angled sub-side surface.

The angled and tapered rear surface 94 may form a ramp which connects the tapered concave upper surface 88 and the ammunition cartridge shoulder guide surface 82. The angled and tapered rear surface 94 may be configured and dimensioned to push the shoulder of an ammunition cartridge toward the rear of the housing as the cartridge moves up the face of the angled and tapered rear surface.

The lower surface 96 may extend from the angled and tapered side surface 90 to the bumper track 76 such that the lower surface forms an end wall for the track. The end wall may be perpendicular to the follower guide surfaces 70, 72, 74 which may form the track.

The starboard side magazine feed lip 30 may include internal guide surfaces 68 for stabilizing or directing movement of the ammunition cartridge body. For example, a series of curved surfaces may connect the starboard side wall to the interior side walls of the magazine feed lip. As shown in FIGS. 19 and 21, a rear guide surface 98, an intermediate guide surface 100, and a front guide surface 102 may be configured and dimensioned to direct the ammunition cartridge body upward and inward as the ammunition cartridge moves forward against the interior guide surfaces.

Figure 20:
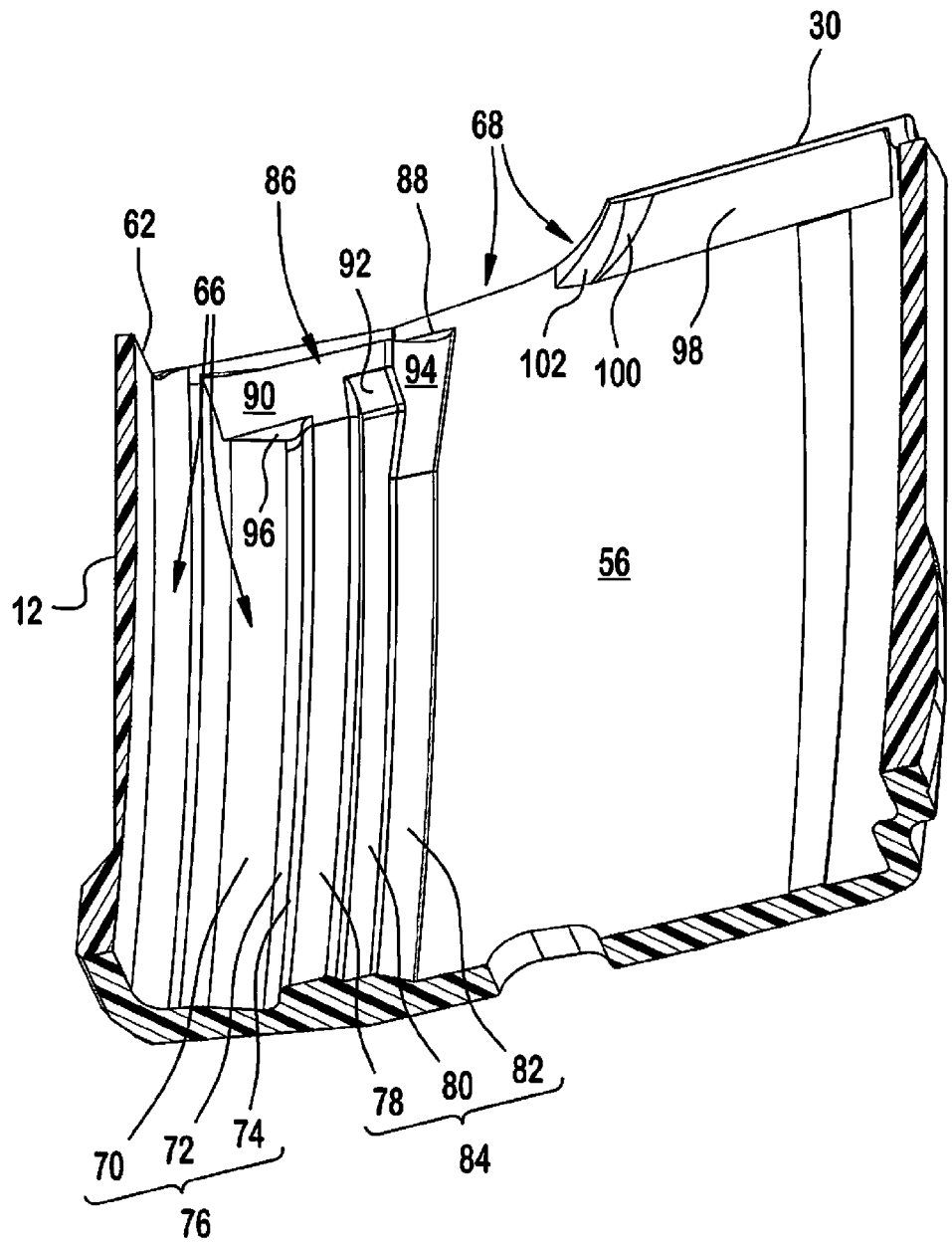
FIG. 20 is another partial cross-sectional perspective view of the magazine casing of FIG. 8.

The features described above in connection with the starboard side wall 56 may be found on the port side wall 54, as well. In general, the internal configuration of the port sidewall may be a mirror image of the starboard side wall. The starboard sidewall features described in FIGS. 7-9 and 19-21, therefore, may have complimentary counterpart features on the port sidewall. Hence, the internal guide structures within the housing may be symmetrical about a central plane 104 that bisects the front sidewall and the rear sidewall of the housing, as shown in FIG. 20. These structures, which are identified with common reference element numbers, may include the follower guide surfaces 76, the ammunition cartridge guide surfaces 84, the multi-faceted block surfaces 90, 92, 64, 96 and the feed lip guide surfaces 98, 100, 102.

Figure 7:
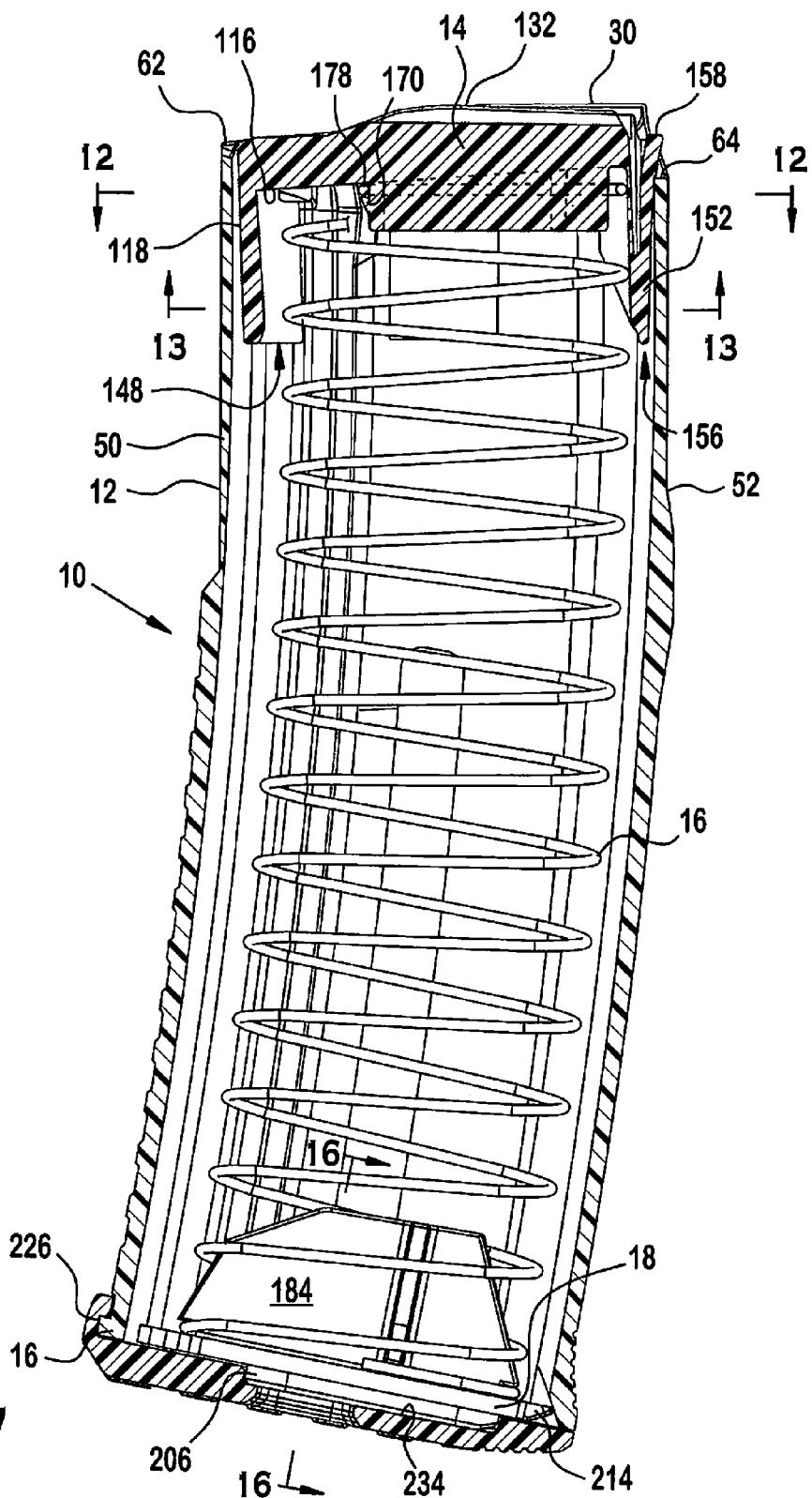
FIG. 7 is a cross-sectional view of the magazine of FIG. 1, along line 7-7, where the magazine is empty and the follower and spring are in an extended configuration.
Figure 17:
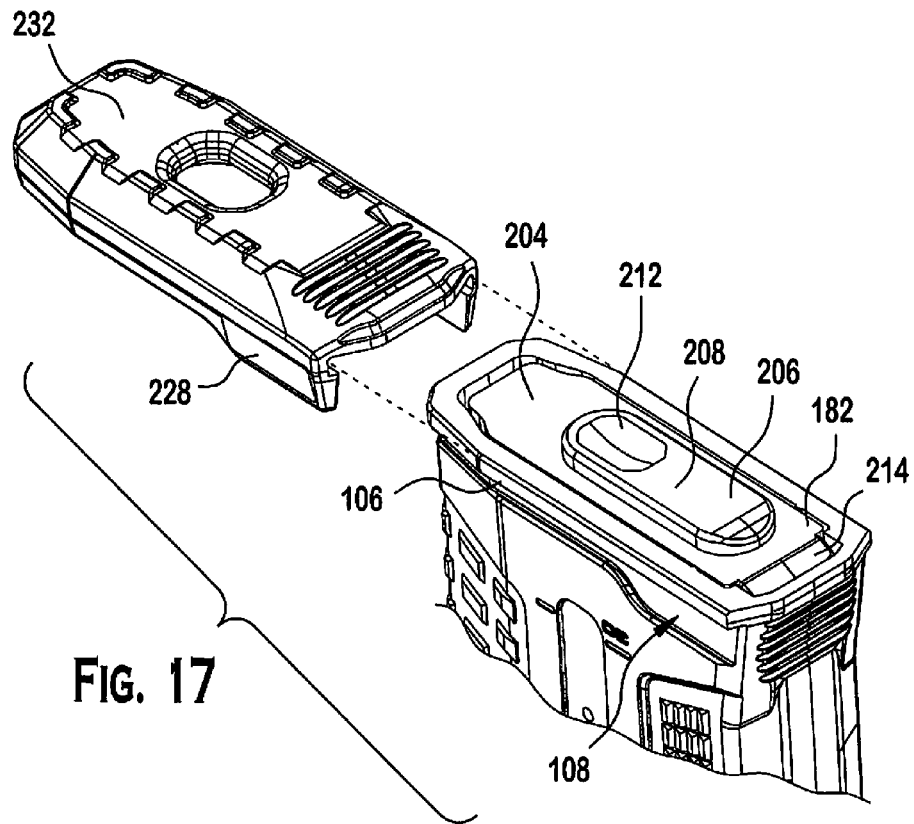
FIG. 17 is a partially exploded view of the bottom end of the magazine of FIG. 1.

Referring to FIGS. 7 and 17, the bottom of the housing 12 may include a flange 106. The flange may extend around the circumference of the housing. The housing may further include a groove 108 above the flange. The groove 108 may extend around three sides of the housing and may widen toward the ends.

Referring to FIG. 11, the follower 14 may include a front end 110, a rear end 112, an upper surface 114, a lower surface 116, and four stabilizing structures. The four stabilizing structures may include a front bumper 118, a rear bumper 120, a port side wing 122 and a starboard side wing 124.

The upper surface 114 of the follower 14 includes a base portion 126, an intermediate portion 128, and a tapered front portion 130. The base portion 126 includes a generally smooth and flat area on the port side and a raised cartridge spacer 132 on the starboard side. The cartridge spacer 132 includes a generally flat rear portion 134, a concave shaped middle portion (or crown) 136, and a sloped front portion 138. The cartridge spacer may include a starboard escarpment 140 and a port escarpment 142. The intermediate portion 128 abuts the base portion 126. The intermediate portion 128 may be generally flat and smooth. The intermediate portion may connect the base portion 126 with the front tapered portion 130. The front tapered portion 130 may narrow and slope downward to the front bumper 118.

Figure 14:
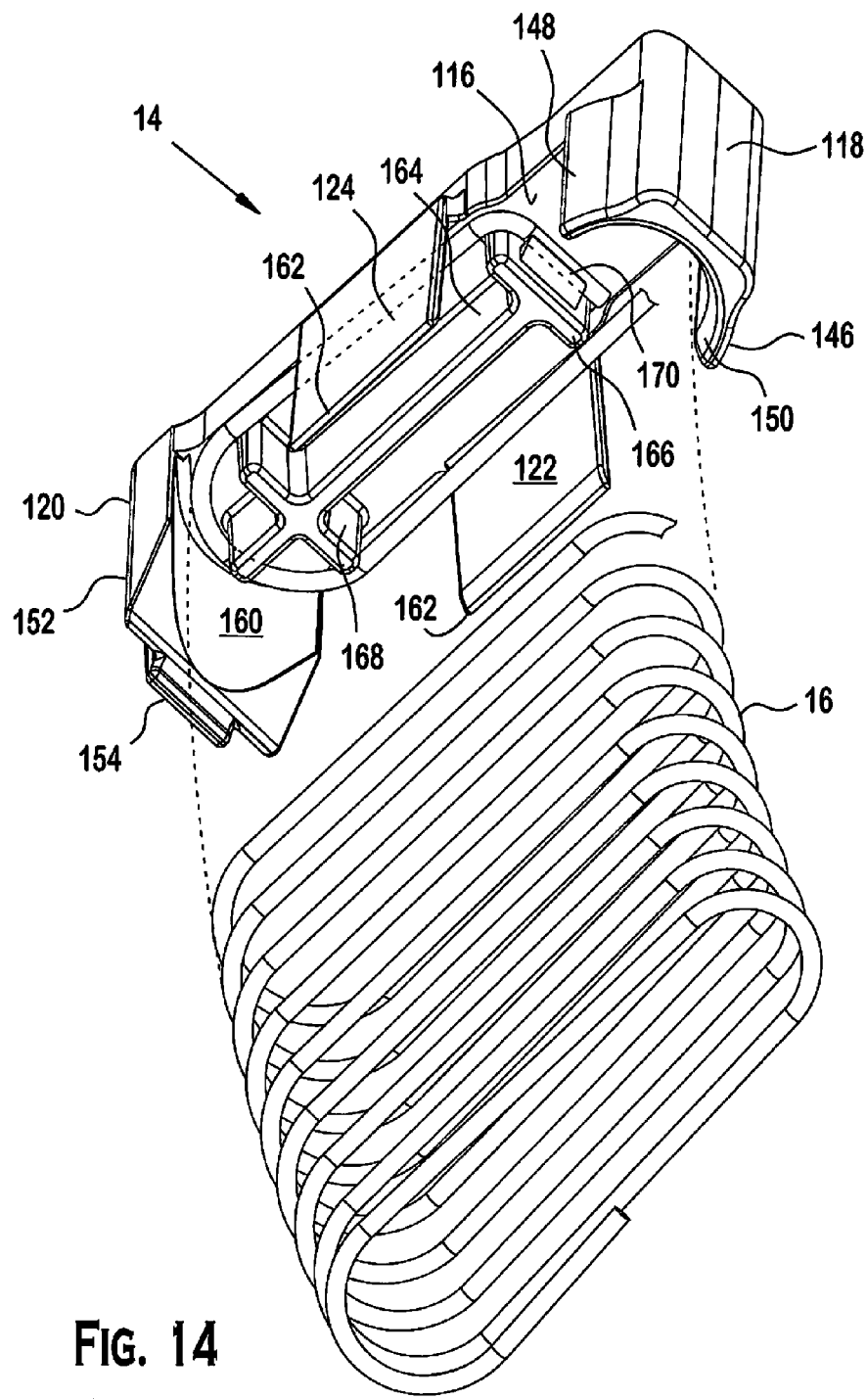
FIG. 14 is a bottom, partial perspective view of the follower and spring of FIG. 6.

The follower may include an upper surface 114, a lower surface 116, and a side surface 144 extending between the upper surface and a lower surface. The follower may include a front bumper 118 that is disposed below the front tapered portion 130 of the upper surface. Referring to FIG. 14, the follower 14 may include a port side bumper 146 and a starboard side bumper 148. The port side bumper 146 may extend laterally and curve backward from the port side of the front bumper 118; the starboard side bumper 148 may extend laterally and curve backward from the starboard side of the front bumper 118. The interior surface of the front bumper, port side bumper, and starboard side bumper may form a smooth curved surface 150. The curved surface may form a front shroud for the magazine spring.

The rear bumper 120 may include a stem 152 which extends downward from the rear end of the upper surface of the follower. The stem may include a resilient tab 154. The resilient tab 154 may be integrally connected to the base of the stem 152. The resilient tab may be configured and dimensioned to slide in a channel 156 on the rear side of the housing. The resilient tab may be flexible, and the gap between the resilient tab and the stem may be sized to allow the resilient tab to be pressed against the stem in a compressed configuration, as well as spaced from the stem in an extended configuration. The tip 158 of the resilient tab may form a ledge which moves the bolt catch of a firearm after the last ammunition cartridge has been removed from the magazine. The interior surface of the stem may include a curved surface 160 which forms a rear shroud for a portion of the magazine spring.

The port side wing 122 may extend downward and away from the port side surface of the follower. The port side wing 122 may be generally rectangular in shape. The port side wing may be relatively thin due to the confined space requirements of the magazine interior. The port side wing may be flexible and resilient. The starboard side wing 124 may be located opposite the port side wing 122 on the starboard side surface of the follower. The starboard side wing 124 may otherwise be similar in construction and resilience to its counterpart. The side wings of the follower may be visible in the windows 46 of the magazine. The bottom edge 162 or a marking on the side wings may cooperate with indicia around the window to indicate the number of ammunition cartridges in the magazine.

The lower surface 116 of the follower 14 may include an axial shank 164, a leading cross shank 166, and a trailing cross shank 168. The leading cross shank may include a ledge 170 beneath the lower surface of the follower. The ledge 170 and the lower surface 116 of the follower 14 may cooperate to form a seat or spring attachment location for the magazine spring. The leading cross shank 166 and the trailing cross shank 168, further may be configured and dimensioned to provide internal support for the magazine spring 16.

Figure 22A:
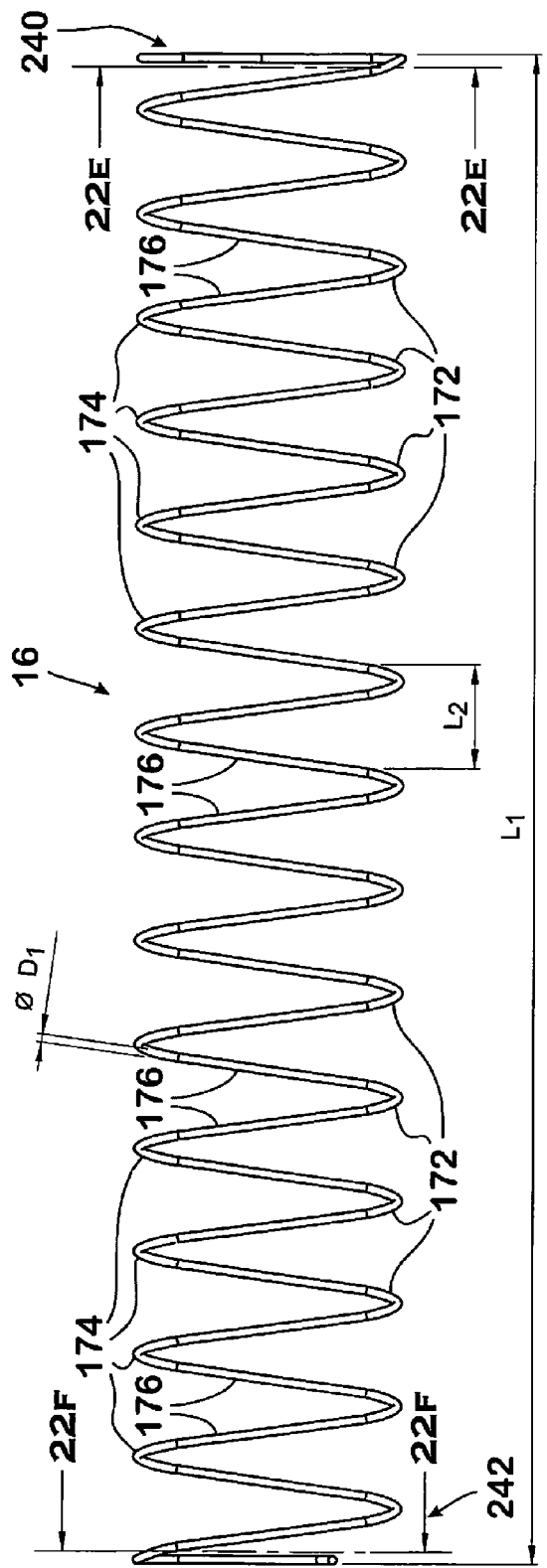
FIG. 22A is a side view of an exemplary design for the magazine spring of FIG. 1.

Referring to FIGS. 12, 22A, 22B, 22C and 22D, the magazine spring 16 may be a compression spring. In the exemplary embodiment, the magazine spring may be formed by a round wire coil that includes a small curve 172 separated from a larger curve 174 by a straight length 176. As shown in FIG. 22A, the wire may have a diameter D1 of approximately 1.5 mm. As shown in FIG. 22D, the radius of the small curve (or small radius) R1 may be approximately 6.5 mm, and the radius of the larger curve (or large radius) R2 may be approximately 8.1 mm. The length of the coil measured from the end of the small curve to the end of the larger diameter curve (or maximum outer dimension of wire coil) L3 may be approximately 49.5 mm.

Figure 15:
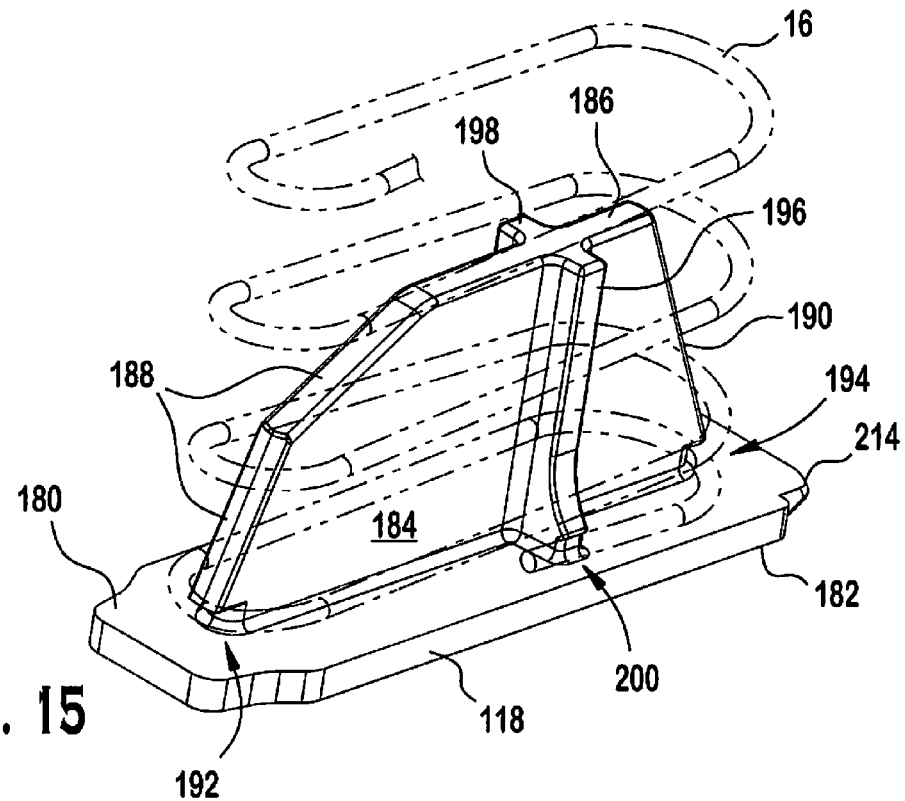
FIG. 15 is a perspective view of the floor plate of FIG. 6.
Figure 16:
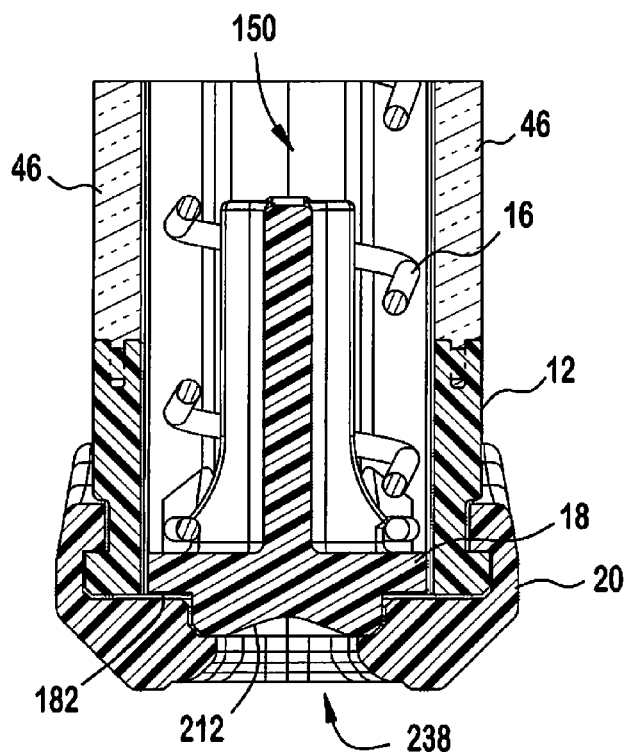
FIG. 16 is a cross-sectional view of the magazine of FIG. 7, along line 16-16.

Referring back to FIG. 22A, the wire may be right hand wound and have a pitch L2 of approximately 19 mm. The ends 240, 242 of the magazine spring may be squared. As shown in FIG. 22E, one end of the magazine spring may terminate with an end segment having a length L4 of approximately 22.8 mm. This end 240 may be configured and dimensioned to connect with the floor plate 18, as shown in FIGS. 15-16 and described below.

Figure 12:
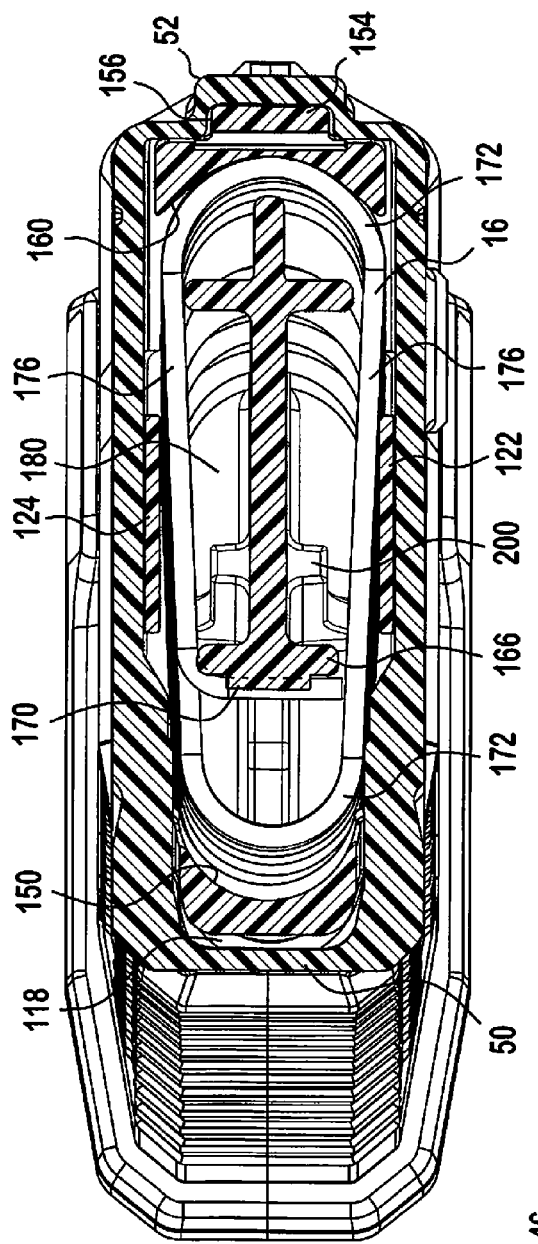
FIG. 12 is a cross-sectional view of the magazine of FIG. 7, along line 12-12.
Figure 13:
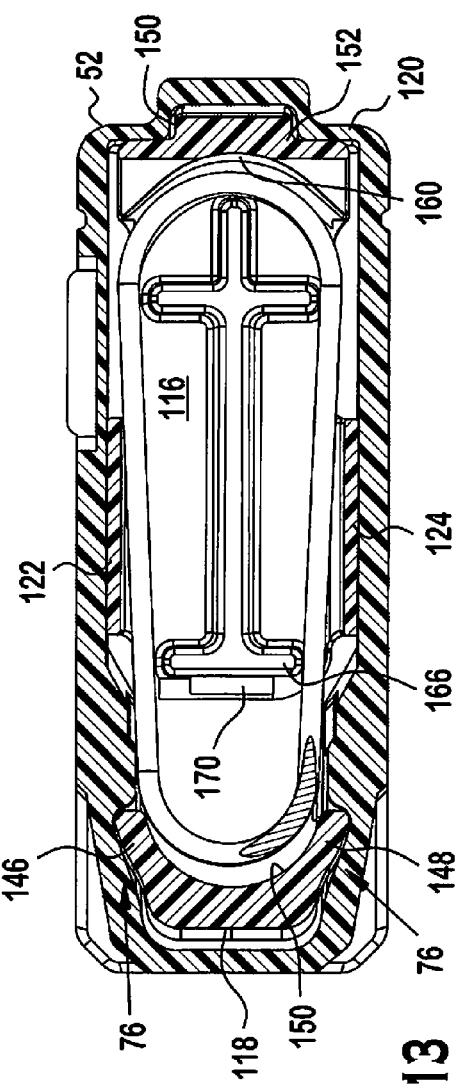
FIG. 13 is a cross-sectional view of the magazine of FIG. 7, along line 13-13.

Referring to FIG. 22F, the other end of the spring 242 may terminate with a generally L-shaped segment having a dimension L5 of approximately 5.0 mm and a length L6 of approximately 37.5 mm. The other end 242 may be configured and dimensioned to connect to the follower 14, as shown in FIGS. 12-14 and described below.

Figure 22B:
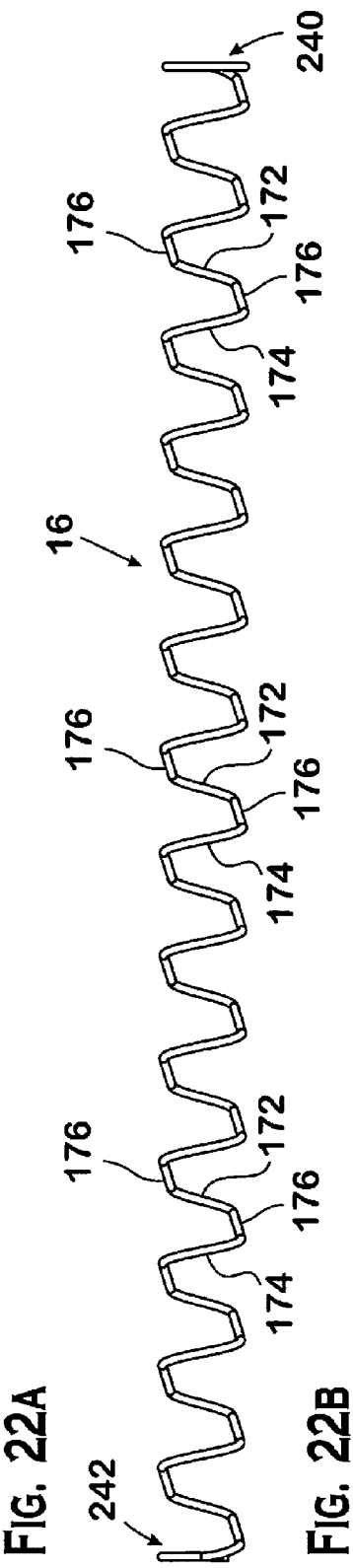
FIG. 22B is a front view of the magazine spring of FIG. 22A.

In the embodiment shown in FIGS. 22A-C, the magazine spring may include approximately 15 total coils. The magazine spring may have a free length of approximately 277 mm, and may possess a preloaded force of approximately 15 N (Newton) for a reference length of 180 mm. The solid height of the coil (or fully closed length) may be approximately 25.5 mm. The wire may be music wire as specified by ASTM A228.

A summary of a preferred magazine spring design for the 30 round magazine of FIG. 1 is presented in Table 1.

TABLE 1

Magazine Spring Design for a 30 Round Capacity Magazine

| Parameter | Variable/ Units | Preferred Upper Value | Preferred Lower Value | Most Preferred Value |
|---|---|---|---|---|
| Outer Dimension (Wire) | D1 (mm) | — | — | 1.5 |
| Free Length | L1 (mm) | — | — | 277.0 |
| Pitch | L2 (mm) | — | — | 19 |
| Outer Dimension (Coil) | L3 (mm) | 49.8 | 49.2 | 49.5 |
| Length of Bottom End | L4 (mm) | 23.1 | 22.5 | 22.8 |
| Length of Offset | L5 (mm) | 5.3 | 4.7 | 5.0 |
| Length of Top End | L6 (mm) | 37.8 | 37.2 | 37.5 |
| Small Radius | R1 (mm) | 6.8 | 6.2 | 6.5 |
| Large Radius | R2 (mm) | 8.4 | 7.8 | 8.1 |
| Offset Radius | R3 (mm) | 2.5 | 1.9 | 2.2 |
| Reference Length | RL (mm) | — | — | 180 |
| Preloaded Force | PF (N) | — | — | 15 |
| Solid Height (or Full Close Length) | LFC (mm) | — | — | 25.5 |

Notes:
(a) Type of ammunition cartridge: 5.56 × 45 mm NATO or .223 Remington.
(b) Type of wire: round wire per ASTM A228.

The general spring configuration of FIGS. 22A-F may be adapted for use in other magazines. For example, the magazine spring may be designed for an ammunition magazine that stores up to ten 5.56×45 mm ammunition cartridges. In one embodiment, a ten round capacity magazine may include a shortened and straighter casing, but which otherwise maintains features and components of the magazine of FIG. 1. In another example, the magazine spring may be adapted for use in an ammunition magazine cartridge that stores up to twenty 5.56×45 mm ammunition cartridges. In yet another example, the magazine spring may be adapted for use in an ammunition magazine cartridge that stores up to thirty five, forty five, or fifty 5.56×45 mm ammunition cartridges.

Table 2 presents a preferred magazine spring design for an ammunition magazine that may store and feed an AR15 type rifle with up to ten 5.56×45 mm ammunition cartridges.

TABLE 2

Magazine Spring Design for a 10 Round Capacity Magazine

| Parameter | Variable/ Units | Preferred Upper Value | Preferred Lower Value | Most Preferred Value |
|---|---|---|---|---|
| Outer Dimension (Round Wire) | D1 (mm) | — | — | 1.5 |
| Free Length | L1 (mm) | — | — | 180.5 |
| Pitch | L2 (mm) | — | — | 19 |
| Outer Dimension (Coil) | L3 (mm) | 49.8 | 49.2 | 49.5 |
| Length of Bottom End | L4 (mm) | 23.4 | 22.8 | 23.1 |
| Length of Offset | L5 (mm) | 5.3 | 4.7 | 5.0 |
| Length of Top End | L6 (mm) | 37.8 | 37.2 | 37.5 |
| Small Radius | R1 (mm) | 6.4 | 5.8 | 6.1 |
| Large Radius | R2 (mm) | 8.4 | 7.8 | 8.1 |
| Offset Radius | R3 (mm) | 2.5 | 1.9 | 2.2 |
| Reference Length | RL (mm) | — | — | 75.0 |
| Preloaded Force | PF (N) | — | — | 15 |
| Solid Height (or Full Close Length) | LFC (mm) | — | — | 20.0 |

Notes:
(a) Type of ammunition cartridge: 5.56 × 45mm NATO or .223 Remington.
(b) Type of wire: round wire per ASTM A228.

The foregoing spring designs are believed to have important operational benefits, such as providing greater spring force at the front of the follower due to the smaller radius at the front end of the coil. Larger spring forces at the front end of the coil may promote reliable feeding of ammunition cartridges from the magazine by overcoming any added local resistance at the front of the casing that may be generated by the interaction of the ammunition cartridges and multi-faceted block. Moreover, larger spring forces at the front end of the coil may provide for a firmer squeeze of the ammunition cartridges near the top of the magazine. This may advantageously position and secure the ammunition cartridges near the top of the magazine, as described in more detail below. Also, larger spring forces at the front end of the coil may promote reliable feeding of ammunition cartridges from the magazine as the quantity of stored ammunition cartridges run low because the attitude of the front end of the follower may be more likely to remain in a neutral or elevated position as the magazine spring approaches the limits of its working length.

Accordingly, the benefits of the foregoing spring designs may be captured and extended by maintaining the general configuration of the magazine spring designs of Table 1 and Table 2 by examining the relationship between the smaller radius and larger radius of the wire coil. This relationship may be described, in part, by a "coil ratio" (or CR), which may be calculated by dividing the larger radius of the wire coil by the smaller radius of the wire coil. For example, the coil ratio of the most preferred magazine spring design presented in Table 1 (where the smaller radius is 6.5 mm and the larger radius is 8.1 mm) is approximately equal to 1.25 (i.e., 8.1/6.5). Likewise, the coil ratio of the most preferred magazine spring design presented in Table 2 (where the smaller radius is 6.1 mm and the larger radius is 8.1 mm) is approximately equal to 1.33 (i.e., 8.1/6.1).

Table 3 presents coil ratio calculation results for the preferred and most preferred values of the spring designs of Table 1 and Table 2.

TABLE 3

Coil Ratios (CRs) for the Spring Designs of Tables 1 and 2

| | | R2 (mm) | | | | | | |
|---|---|---|---|---|---|---|---|---|
| | | 7.8 | 7.9 | 8.0 | 8.1 | 8.2 | 8.3 | 8.4 |
| R1 (mm) | 5.8 | 1.34 | 1.36 | 1.38 | 1.40 | 1.41 | 1.43 | 1.45 |
| | 5.9 | 1.32 | 1.34 | 1.36 | 1.37 | 1.39 | 1.41 | 1.42 |
| | 6.0 | 1.30 | 1.32 | 1.33 | 1.35 | 1.37 | 1.38 | 1.40 |
| | 6.1 | 1.28 | 1.30 | 1.31 | 1.33 | 1.34 | 1.36 | 1.38 |
| | 6.2 | 1.26 | 1.27 | 1.29 | 1.31 | 1.32 | 1.34 | 1.35 |
| | 6.3 | 1.24 | 1.25 | 1.27 | 1.29 | 1.30 | 1.32 | 1.33 |
| | 6.4 | 1.22 | 1.23 | 1.25 | 1.27 | 1.28 | 1.30 | 1.31 |
| | 6.5 | 1.20 | 1.22 | 1.23 | 1.25 | 1.26 | 1.28 | 1.29 |
| | 6.6 | 1.18 | 1.20 | 1.21 | 1.23 | 1.24 | 1.26 | 1.27 |
| | 6.7 | 1.16 | 1.18 | 1.19 | 1.21 | 1.22 | 1.24 | 1.25 |
| | 6.8 | 1.15 | 1.16 | 1.18 | 1.19 | 1.21 | 1.22 | 1.24 |

As shown in Table 3, the CR values for the preferred Small Radius and Large Radius values of the spring design of Table 1 range from approximately 1.15 to approximately 1.35. The CR value for the most preferred Small Radius and Large Radius values of the spring design of Table 1 is approximately 1.25. By comparison, the CR values for the preferred Small Radius and Large Radius values of the spring design of Table 2 range from approximately 1.22 to approximately 1.45. The CR value for the most preferred Small Radius and Large Radius values of the spring design of Table 2 is approximately 1.33.

The combined range of CR values for the preferred Small Radius and Large Radius values of the spring designs of Table 1 and Table 2 range from approximately 1.15 to approximately 1.45. These CR values reflect magazine spring coil configurations that provide suitable operation of two ammunition magazines constructed in accordance with aspects of the present invention.

The shared range of CR values for the spring designs of Table 1 and Table 2 range from approximately 1.22 to approximately 1.35. The CR values for the most preferred Small Radius and Large Radius values of the spring designs of Table 1 and Table 2 are contained within the shared range of CR values These CR values reflect magazine spring coil configurations that provide enhanced operation of two ammunition magazines constructed in accordance with aspects of the present invention.

Magazine springs for small arms weapons, however, generally may have a small radius R1 that ranges from approximately 3 mm to approximately 7 mm and a large radius R2 that ranges from approximately 5 mm to approximately 9 mm, as long as the larger radius R2 is greater than the small radius R1. Hence, CR values for a magazine spring for many small arms weapons generally may be greater than 1 and less than approximately 3.

Moreover, in view of foregoing, CR values for a magazine spring for a small arms weapon preferably may be at least 1.05. More preferably, CR values a magazine spring for a small arms weapon may range from approximately 1.10 to approximately 1.50. Most preferably, CR values for a magazine spring for a small arms weapon may range from approximately 1.20 to approximately 1.35. In the embodiment of the magazine spring design of Table 1, the optimum RV value is approximately 1.25. In the embodiment of the magazine spring design of Table 2, the optimum RV value is approximately 1.32.

Although the spring designs of Table 1 and Table 2 are believed to have important operational benefits, other wire types, dimensions, or configurations may be used provided the alternate magazine spring design provides reliable operation of the magazine.

Figure 36A:
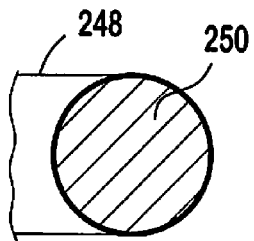
FIG. 36A shows a spring wire with a round (or circular) cross section.
Figure 36B:
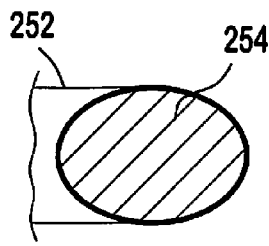
FIG. 36B shows a shaped spring wire with an oval cross section.
Figure 36C:
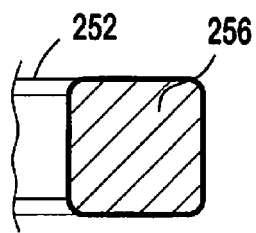
FIG. 36C shows a shaped spring wire with a square cross section.
Figure 36D:
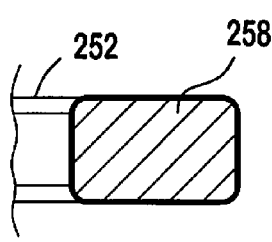
FIG. 36D shows a shaped spring wire with a rectangle cross section.
Figure 36E:
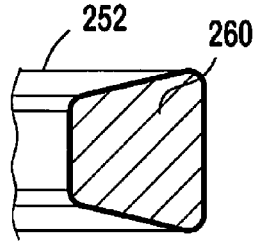
FIG. 36E shows a shaped spring wire with a trapezoid cross section.
Figure 36F:
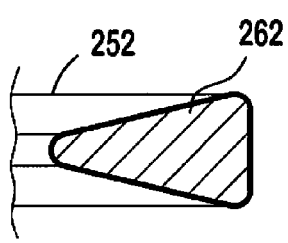
FIG. 36F shows a shaped spring wire with a sharp triangle cross section.
Figure 36G:
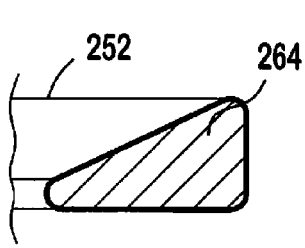
FIG. 36G shows a shaped spring wire with a wedge cross section.
Figure 36H:
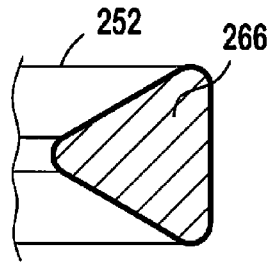
FIG. 36H shows a shaped spring wire with an equilateral triangle cross section.
Figure 36I:
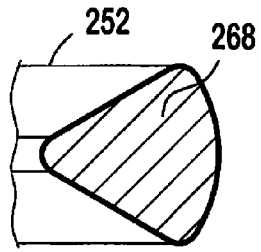
FIG. 36I shows a shaped spring wire with a pie cross section.

Referring to FIGS. 36A-L, the magazine spring may be formed from round, shaped, or stranded wire. Round wire 248 may have a circular cross section 250 (FIG. 36A). Typically, round wire diameters may range from 0.10 mm to 16 mm.

Figure 36J:
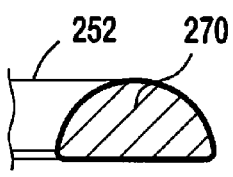
FIG. 36J shows a shaped spring wire with a half round (or D) cross section.

Referring to FIGS. 36B-J, shaped wire 252 may be defined as wire with a cross-sectional shape other than round, which may be produced by cold rolling. Typical shapes may include oval 254 (FIG. 36B), square 256 (FIG. 36C), rectangular 258 (FIG. 36B), trapezoid (or "keystone") 260 (FIG. 36E), sharp triangle 262 (FIG. 36F), wedge 264 (FIG. 36G), equilateral triangle 266 (FIG. 36H), pie 268 (FIG. 36I), and half round 270 (FIG. 36J). The solid height of a shaped wire may be less than that of a similar round wire spring. Also, using chrome silicon shaped wire rather than traditional carbon steel material may produce a spring that can withstand additional shock and heat.

Figure 36K:
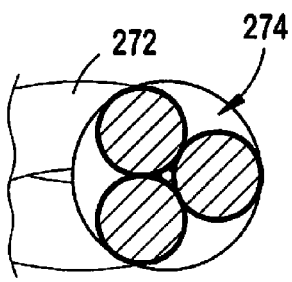
FIG. 36K shows a stranded spring wire in cross section, the stranded spring wire being formed from three strands.
Figure 36L:
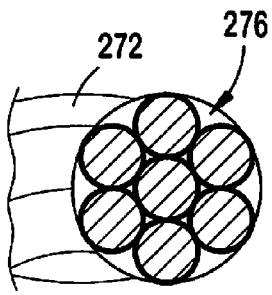
FIG. 36L shows a stranded spring wire in cross section, the stranded spring wire being formed from seven strands.

Referring to FIGS. 36K and 36L, stranded wire 272 may be formed from several strands of wire (e.g., three to seven strands of wire) that are machine-twisted or woven around each other 274 (FIG. 36K), or around one wire that serves as a core 276 (FIG. 36J), to form a single strand. The stranded wire may be made of music wire, rocket wire or other suitable material. Stranded wire springs may be well suited to repetitive impact loading conditions and may provide a long life cycle for the spring.

Spring materials may be high strength alloys having a Young's Modulus, E, ranging from approximately $190 \times 10^3$ MPa at standard temperature and pressure. Suitable spring wire may include carbon steel wire, including without limitation music wire. Preferably, the music wire may conform with ASTM A228. Alloy steel wire, such as chrome silicon wire, as well as other materials may be used.

Additionally, the magazine spring of FIG. 22A may be designed for use with ammunition magazines that store 5.45× 51 mm ammunition cartridges, 5.45×39 mm ammunition cartridges, 7.62×54 mm ammunition cartridges; 7.62×51 mm ammunition cartridges, 7.62×39 mm ammunition cartridges; .308 Winchester ammunition cartridges; and other ammunition cartridges. The casing and other magazine components may need to be adjusted for these applications as well. For instance, the magazine casing may need to be modified for weapon compatibility. For example, the magazine of FIG. 1 may be tailored for compatibility with the following non-limiting list of small arms weapons: AR-15, M16, M4, M249, LSAT, HK416, AK-47, and Negev LMG.

Figure 8:
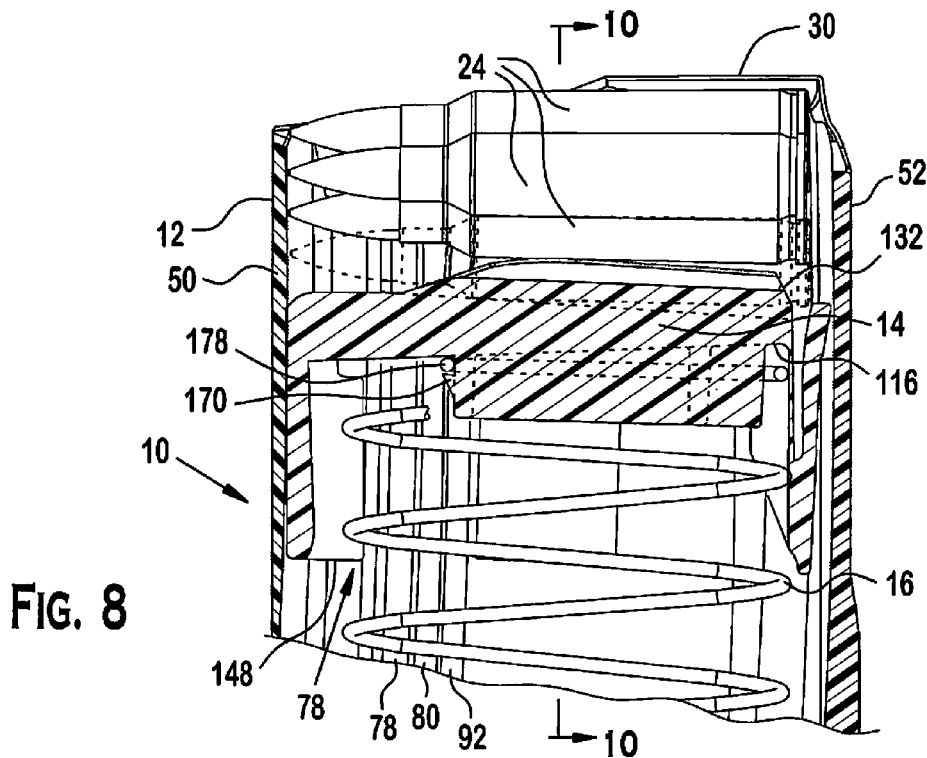
FIG. 8 is a partial cross-sectional view of the magazine of FIG. 1, along line 7-7, where the magazine is partially loaded with ammunition cartridges and the follower and spring are in a depressed configuration.

Referring to FIGS. 7 and 8, the magazine spring 16 may be secured to the follower at the seat 178 formed by the ledge 170 on the leading cross shank and the opposing lower surface 116 of the follower.

Figure 9:
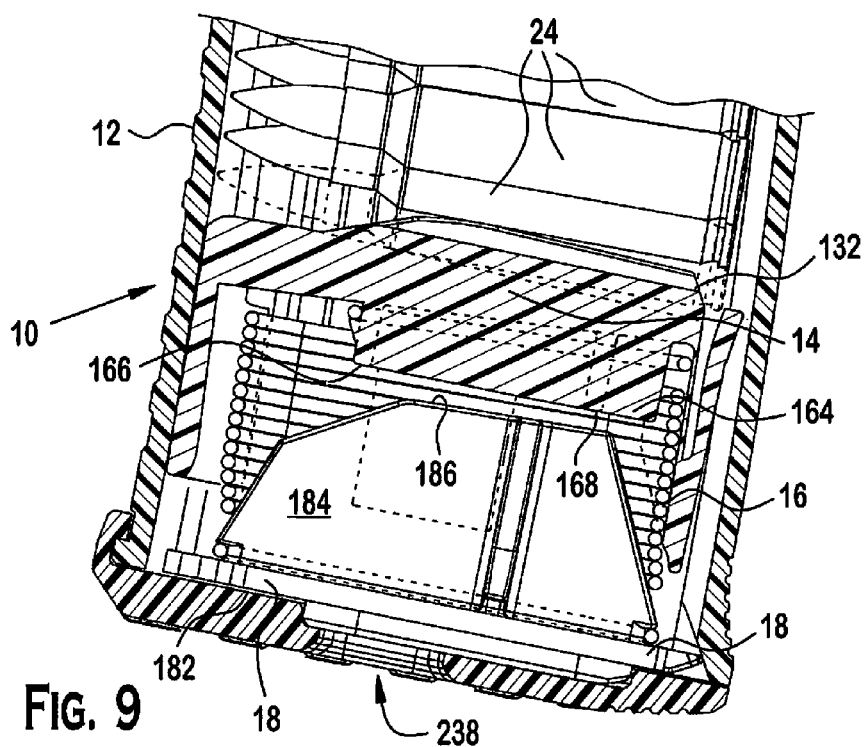
FIG. 9 is a partial cross-sectional view of the magazine of FIG. 1, along line 7-7, where the magazine is fully loaded with ammunition cartridges and the follower and spring are in a nearly fully depressed configuration.
Figure 9A:
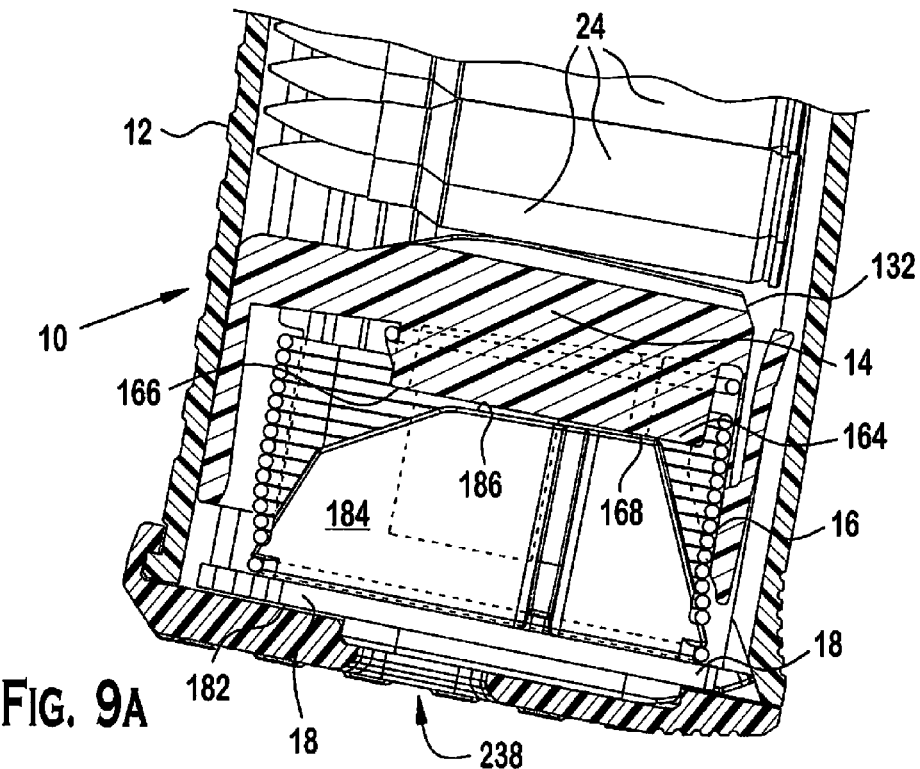
FIG. 9a is a partial cross-sectional view of another embodiment of the magazine of FIG. 1, along line 7-7, where the magazine is fully loaded with ammunition cartridges and the follower and spring are in a fully depressed configuration.
Figure 9B:
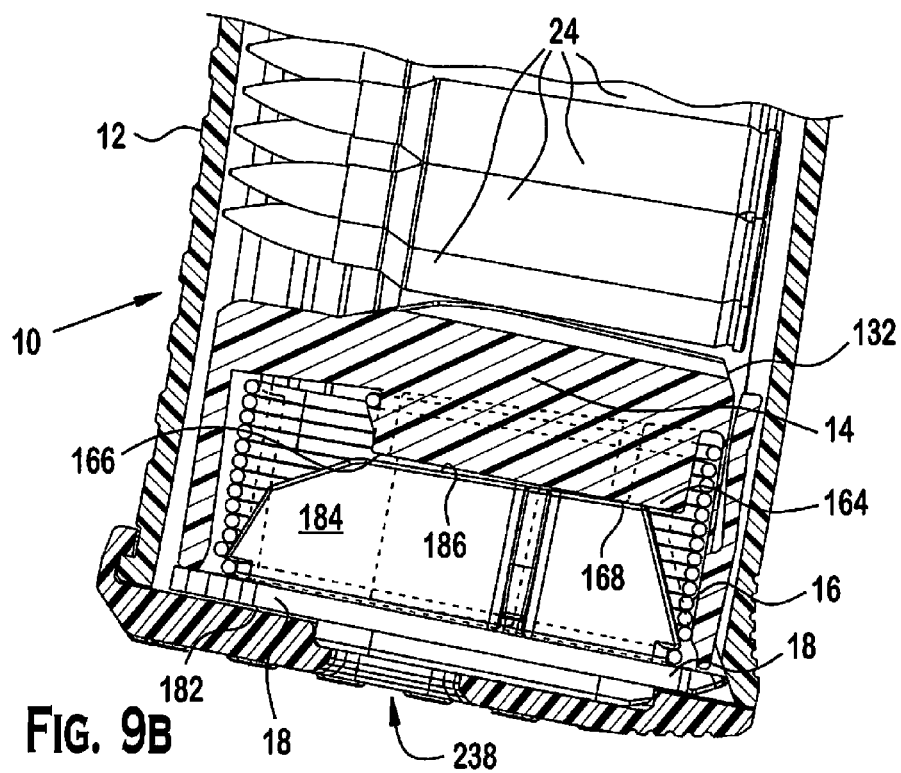
FIG. 9b is a partial cross-sectional view of yet another embodiment of the magazine of FIG. 1, along line 7-7, where the magazine is fully loaded with ammunition cartridges and the follower and spring are in a fully depressed configuration.

Referring to FIG. 15, the floor plate 18 may include an upper surface 180 and lower surface 182. The upper surface of the base plate may include an axial wall 184. The axial wall 184 may include an upper side 186 that is spaced from the upper surface of the floor plate. The upper side 186 of the axial wall may have a length that is shorter than the axial shank 164 of the follower. The axial wall may include a front side 188 that extends from the front of the top surface to the upper surface 180 of the floor plate. Additionally, the axial wall may include a rear side 190 that extends from the rear of the top surface to the upper surface 180 of the floor plate. The front side 188 of the axial wall may include a notch 192 near the upper surface 180 of the floor plate. The front notch 192 may be configured and dimensioned to receive and secure a spring wire. The rear side 190 of the axial wall may include a notch 194 near the upper surface of the floor plate. The rear notch 194 may be configured and dimensioned to receive and secure a spring wire. The axial wall may include side buttresses 196, 198. The side buttresses may each include a side notch 200, 202 for receiving and securing the magazine spring 16. As shown in FIGS. 7 and 9, the lower end of the magazine spring 16 may be secured to the floor plate at four magazine spring attachment points. Two attachment points may be notches 192, 194 near the base of the axial wall, and two attachment points may be notches 200, 202 near the base of each buttress.

Referring to FIGS. 9, 16, and 17, the lower side 182 of the floor plate 18 may include a planar surface 204 and a raised area 206 that extends away from the planar surface. The raised area 206 may include a flat upper surface 208 and a sidewall 210 extending from the upper surface to the lower side of the floor plate. The raised area may be formed in a button shape. The upper surface of the raised area may include a concave surface 212. The upper side 180 of the floor plate and the lower side 182 of the floor plate may have different lengths. For example, the length of the upper side may be greater than the length of the lower side. The rear end of the floor plate may taper from a longer upper surface to a shorter lower surface to form a projection 214.

Figure 18:
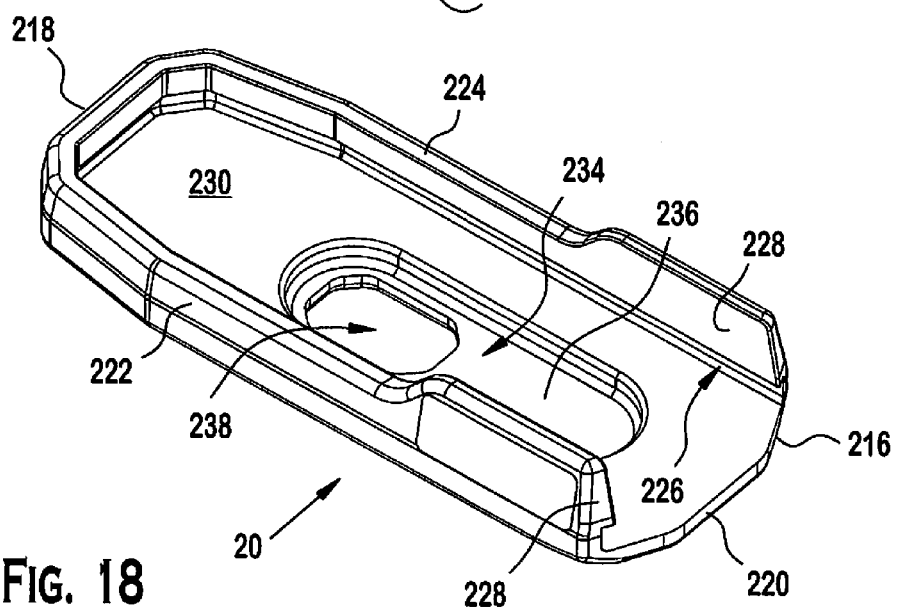
FIG. 18 is a perspective view of the base of FIG. 6.

Referring to FIG. 18, the base may include an elongated plate 216. The elongated plate may include a front side 218, a rear side 220, and lateral sides 222 between the front and rear sides. The base may further include a side wall 224. The side wall 224 may surround the elongated plate on three sides. For example, the side wall may surround the elongated plate on the front and lateral side. Referring to FIGS. 16 and 17, the side wall may include a groove 226. The groove 226 may be configured and dimensioned to slide on to the housing flange 106. Each end of the side wall may include an attachment structure 228, such as a lever, which is configured and dimensioned to form a mechanical joint with the housing. For example, the lever 228 and housing ledge 106 may form a snap-fitting. Preferably, the snap-fitting is a releasable joint.

Referring to FIGS. 17 and 18, the elongated plate 216 may include an interior surface 230 and an exterior surface 232. The interior surface 230 may include a notch 234. The notch 234 may include an end wall 236. The end wall may include an opening 238 which extends to the exterior surface 232 of the plate. The notch 234 may be configured and dimensioned to mate with the raised area on the floor plate.

Referring to FIG. 7, the magazine may have an unloaded configuration in which the follower 14 may be disposed in the housing 12 such that the front bumper 118 faces the front wall of the housing, the lower portion of the resilient tab 152 may be in the channel 156 on the rear side 52 of the housing, and the tip of the resilient tab 158 may be positioned above the rear sill 64. Additionally, the starboard side bumper 148 may press against the lower surface 96 of the multi-faceted block on the starboard side 56 of the housing, and the port side bumper 146 may press against the lower surface 96 of the multi-faceted block on the port side of the housing. Moreover, the spacer 132 may press against the starboard side magazine feed lip 30. The magazine spring 16 may exert a force of approximately 15 N on the follower 14. The magazine spring 16 also may exert an opposite force of approximately 15 N on the floor plate 18. The raised area 206 on the lower surface of the floor plate may be disposed in the notch 234 on the interior surface of the base plate, and the base plate groove 226 may be interlocked with the housing flange 106.

Referring to FIG. 12, the front bumper 118 may be spaced from the front wall 50 of the housing, the resilient tab 154 may be disposed in the channel 156 on the rear wall of the housing, and the top of the magazine spring 16 may be secured to the leading cross shank 166 and contained within the front shroud 150, rear shroud 160, starboard side wing 124, and port side wing 122.

Referring to FIG. 13, the starboard side bumper 148 and port side bumper 146 are disposed in the starboard side bumper track 76 and port side bumper track 76, respectively. The stem 152 of the resilient member may be disposed in the channel 156 on the rear sidewall 52 of the housing, and the rear bumper 120 may be disposed against the rear side wall 52 of the housing. The top of the magazine spring may be secured to the leading cross shank 166 and contained within the front shroud 150, rear shroud 160, starboard side wing 124, and port side wing 122.

Referring to FIGS. 8, 9, and 10, ammunition cartridges 24 may be loaded into the magazine 10. As shown in FIG. 10, the ammunition cartridges 24 may be stacked in two columns on the follower 14. The port side row of ammunition cartridges may generally rest on the upper surface 114 and the starboard side row of ammunition cartridges rest on the cartridge spacer 132. The cartridge 24 nearest the top of the magazine is retained by the magazine feed lip 30 on the starboard side of the housing. Referring to FIG. 8, the starboard bumper 148 is disposed in the starboard bumper track 76 and the starboard facing sides of the ammunition cartridges are pressed against ammunition cartridge guide surfaces 78, 80, 82. Referring to FIG. 9, as the magazine reaches full capacity the follower 14 approaches the base 20 of the magazine. When the magazine is fully loaded with ammunition cartridges (i.e., in the fully loaded configuration), the axial shank 164 or cross shanks 166, 168 of the follower rest on top of the axial wall 186. This blocks over compression of the magazine spring 16 because the solid height of the spring is less than the distance from the spring attachment points 192, 194, 200, 202 on the upper surface of the floor plate to the spring attachment point 170 under the lower surface of the follower. In another embodiment, the front bumper 118 and rear bumper 120 of the follower 14 also rest on the floor plate 18 in the fully loaded configuration. The bottom ammunition cartridge has been removed from FIGS. 8 and 9 to generally illustrate the relation between the features of the ammunition cartridges and the ammunition cartridge guide surfaces.

The magazine components (other than the spring) may be formed from a polymer material. For example, the housing may be formed from an injection molded polymer (e.g., polyamide, polyphthalamide (PPA), or poly aryl ether ketone (PEK)). Preferably, the housing may be formed from polyamide nylon 6,6. Additionally, the polymer matrix may include reinforcement fibers (e.g., carbon-fiber or glass-fiber). Although polymer or reinforced polymer materials may be preferred for forming the magazine components, other materials that are sufficiently strong and durable may be used. For example, the magazine components may be manufactured from aircraft quality aluminum, titanium, steel or other alloys. Also, magazine components may be formed by over molding a second material over a base part. For example, an elastomer (e.g., rubber), may be over molded on to a component formed from carbon-fiber reinforced polymer. Accordingly, the fore grip and rear grip portions of the housing may be formed from rubber that is molded on top of a carbon-fiber reinforced polymer material.

Figure 35:
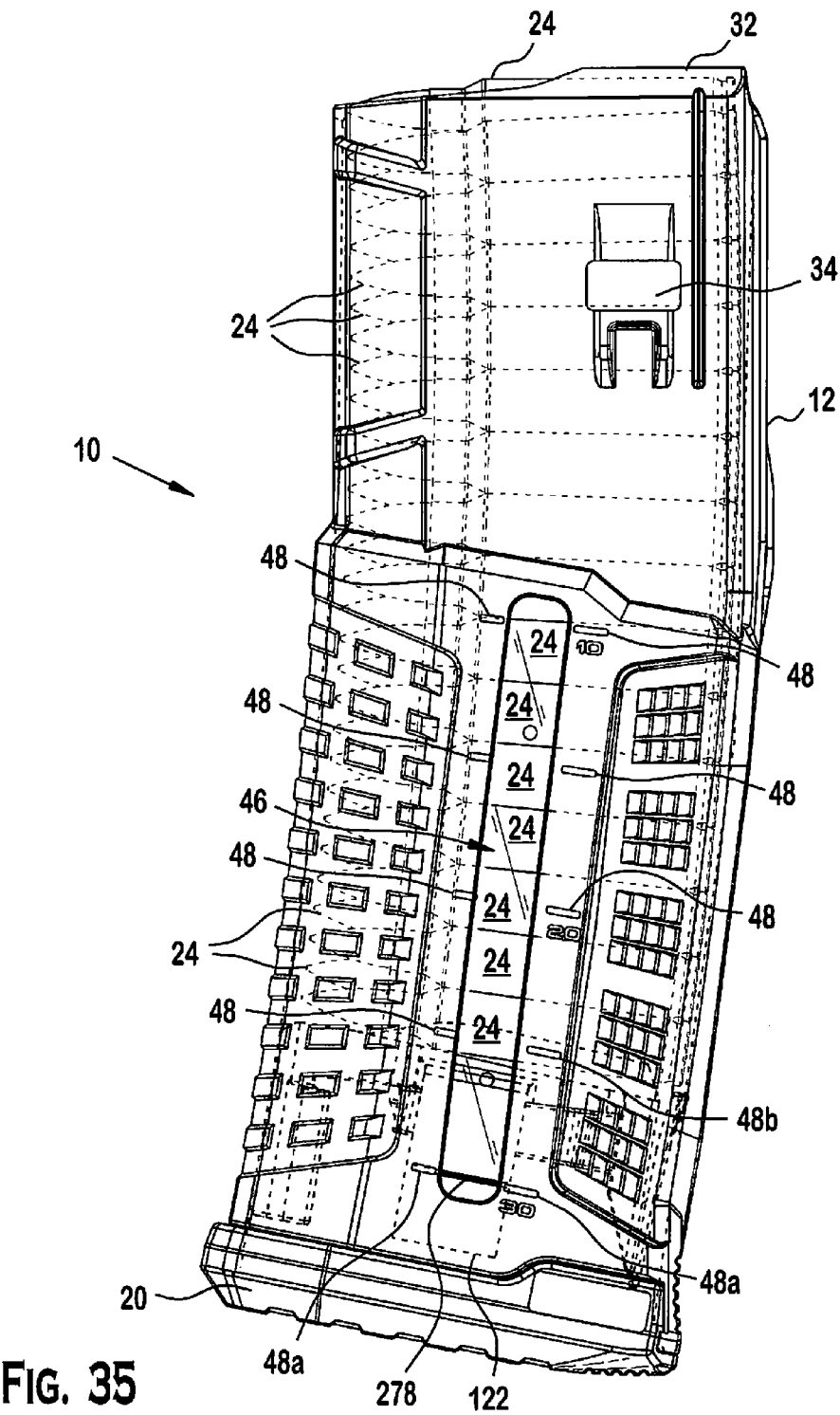
FIG. 35 is a schematic depiction of the right side view of the magazine of FIG. 1 loaded with 30 ammunition cartridges, as indicated by a marking on the port side wing which is visible through a window in the magazine casing.

Referring to FIG. 35, the follower 14 may include one or more markings 278 (e.g., a line, an arrow, dot, triangle, visual target, or illuminated feature) which are visible through one (or both) window(s) 46 in the magazine casing 12. The marking(s) 278 may cooperate with the indicia 48 on the sides of the window 46 to indicate the number of ammunition cartridges 24 in the magazine. For example, the marking 278 may be a line that points to a tick mark 48a along a numerical scale that is positioned on the side of the window to provide a visual indication of the number of ammunition cartridges 24 in the magazine.

Figure 29:
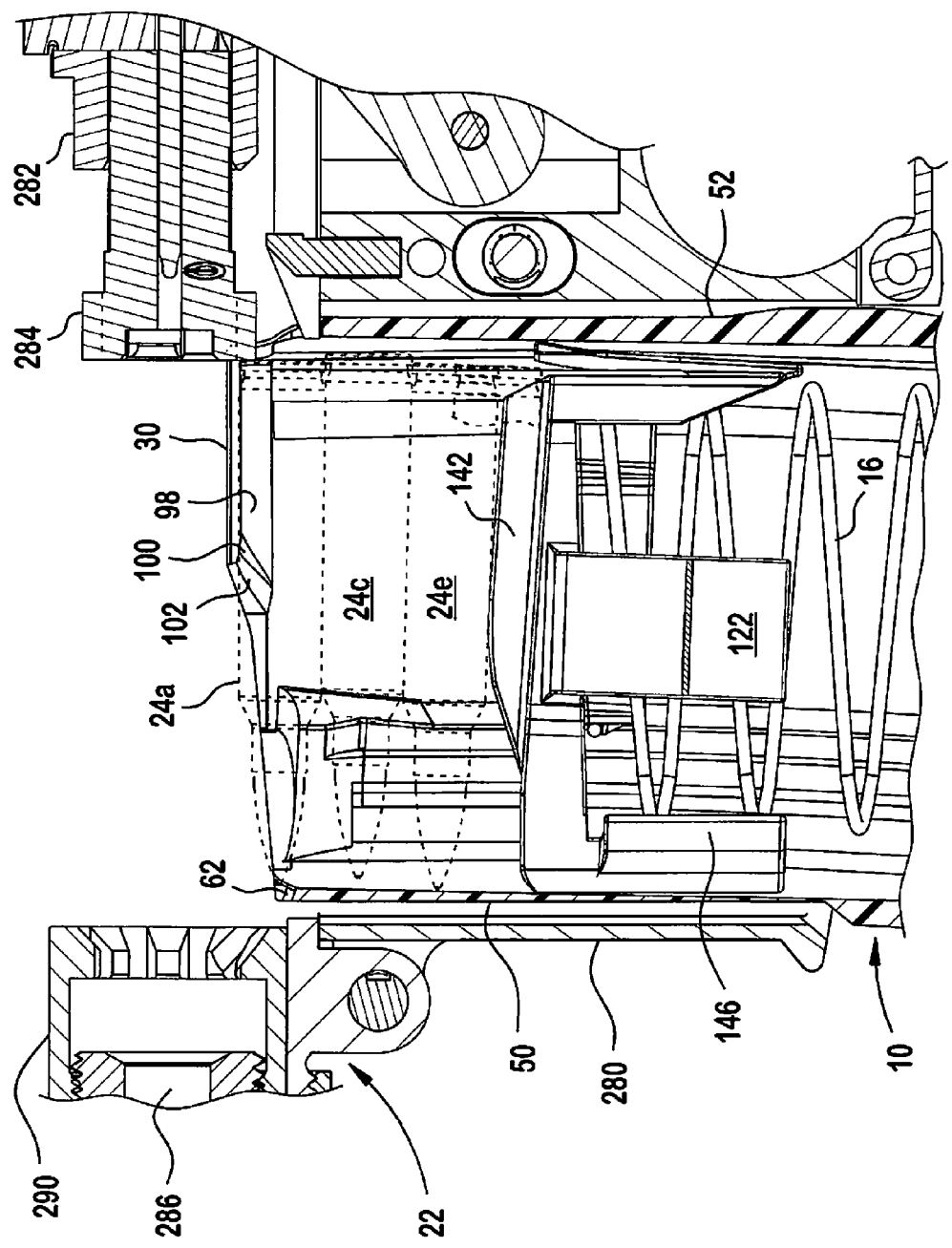
FIG. 29 is a schematic depiction of the effect of the ammunition guide surfaces and multifaceted block on the position of an ammunition cartridge as a bolt carrier of an AR-15 type rifle engages an ammunition cartridge stored in the magazine of FIG. 1.
Figure 30:
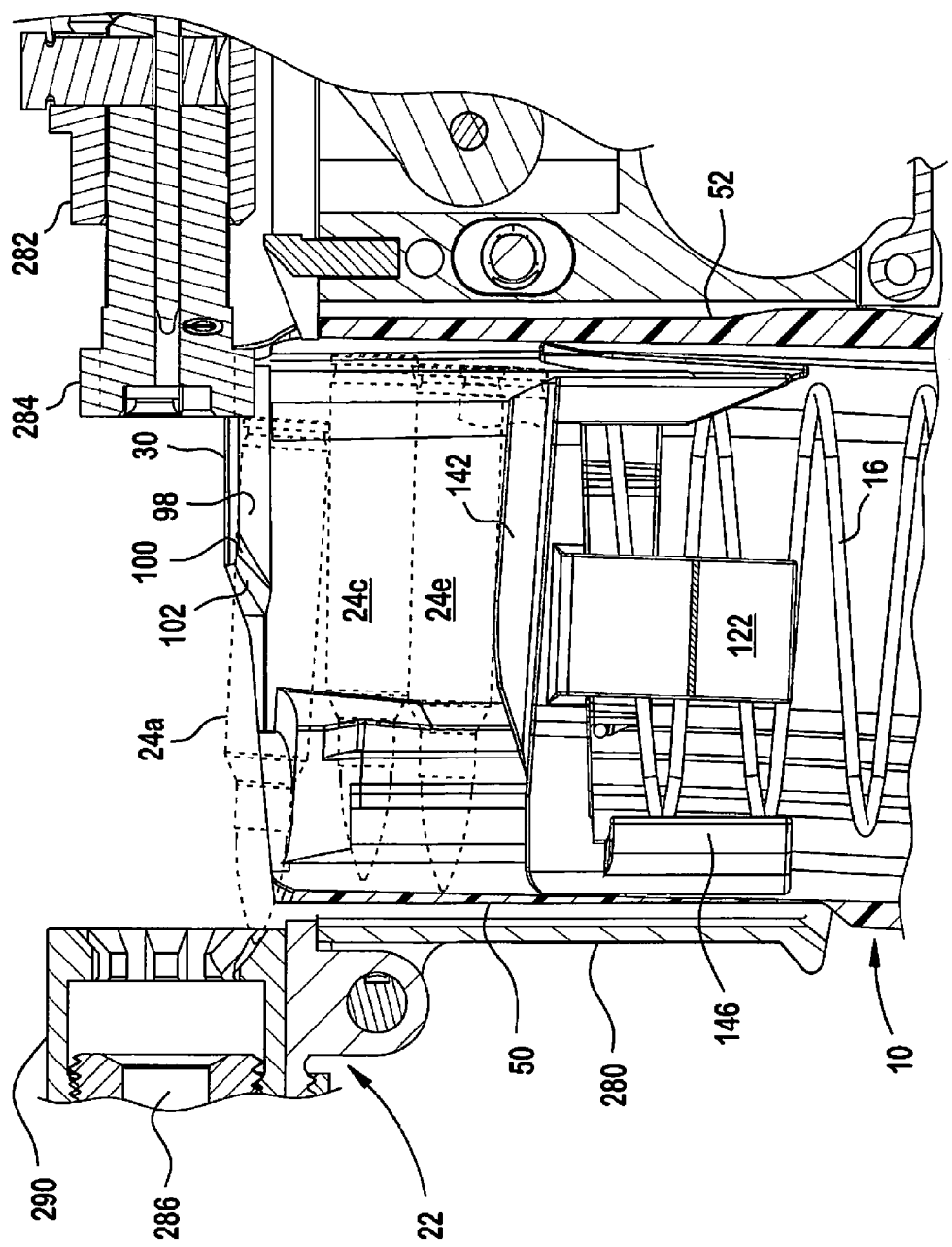
FIG. 30 is a schematic depiction of the effect of the ammunition guide surfaces and multifaceted block on the position of the ammunition cartridges as a bolt carrier of an AR-15 type rifle feeds the engaged ammunition cartridge into the barrel extension of the rifle.
Figure 31:
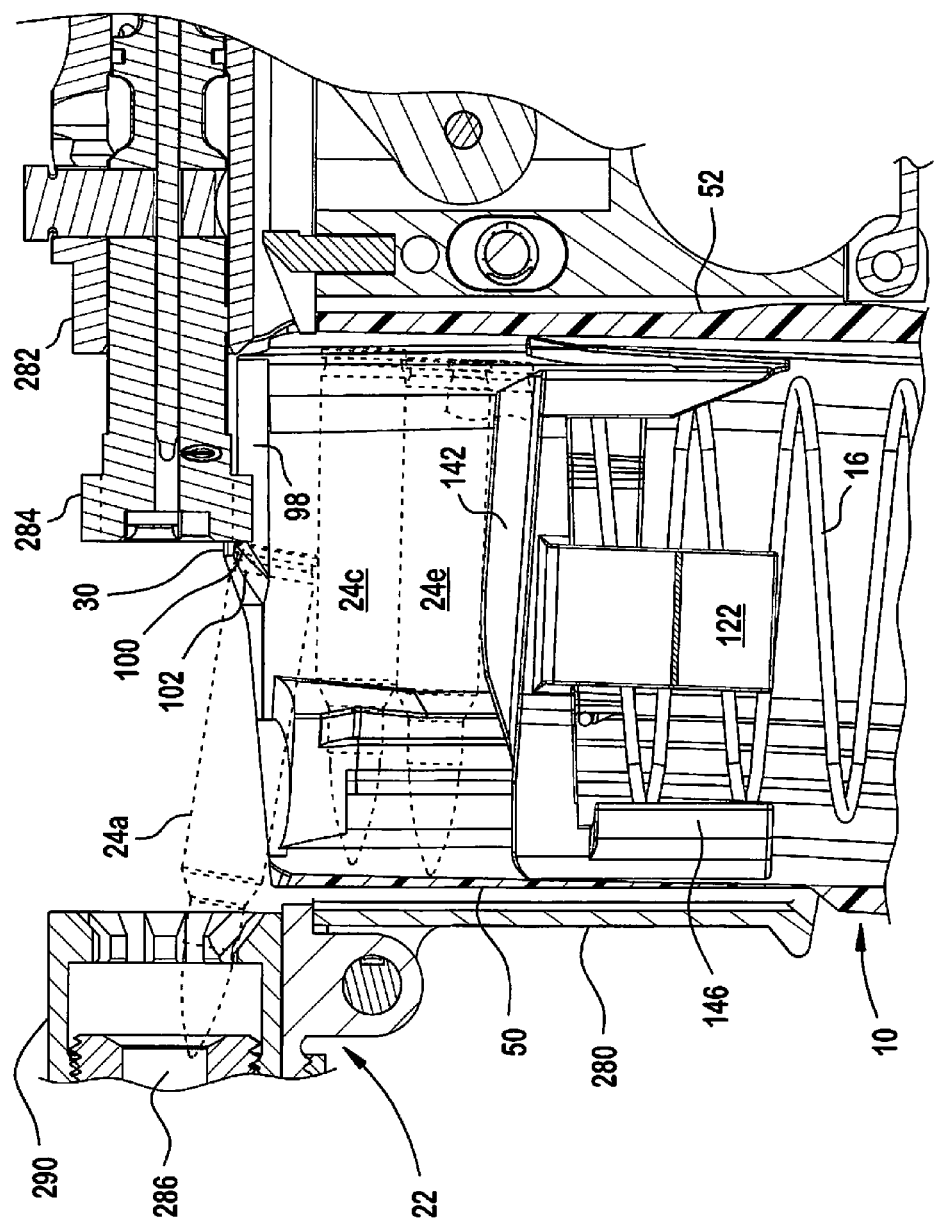
FIG. 31 is a schematic depiction of the effect of the ammunition guide surfaces and multifaceted block on the position of the ammunition cartridges as a bolt carrier of an AR-15 type rifle feeds the engaged ammunition cartridge into the chamber of the rifle.

In use, a loaded magazine 10 (FIG. 35) may be inserted into the magazine well 280 of a small arms weapon 22 such as an M4, M-16, or AR-15 type firearm (see e.g., FIG. 3). As the weapon 22 is charged (FIGS. 29-31), the bolt carrier 282 may advance between the magazine feed lips and the bolt 284 may push the uppermost ammunition cartridge 24 forward, inward, and upward over the front sill 62 of the magazine toward the barrel extension 290 and firearm chamber 286. As described below, the tapered concave upper surface 88 of the multi-faceted block and adjacent front sidewall of the magazine, as well as the guide surfaces 98, 100, 102 on the magazine feed lips 30, 32 are configured to stabilize and direct the transfer of ammunition cartridges to the firearm chamber (FIGS. 23-28).

Figure 23:
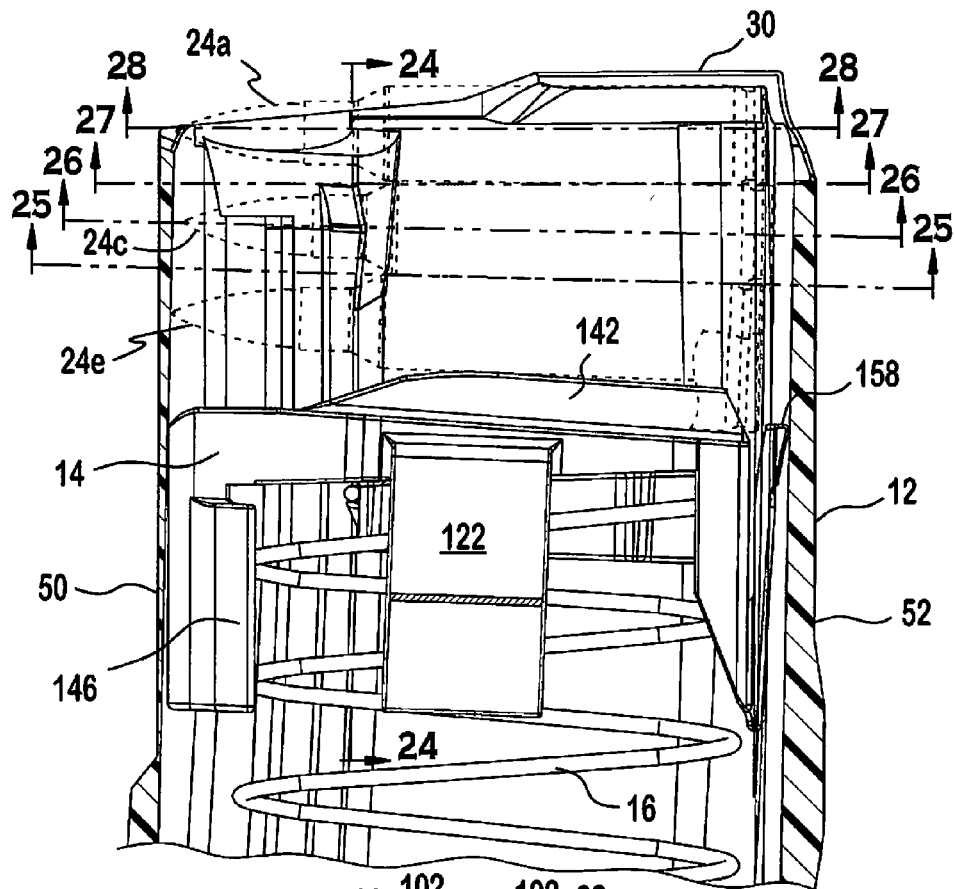
FIG. 23 is a schematic depiction of the effect of the ammunition guide surfaces and multi-faceted block on the position of six ammunition cartridges disposed in the magazine of FIG. 1.
Figure 26:
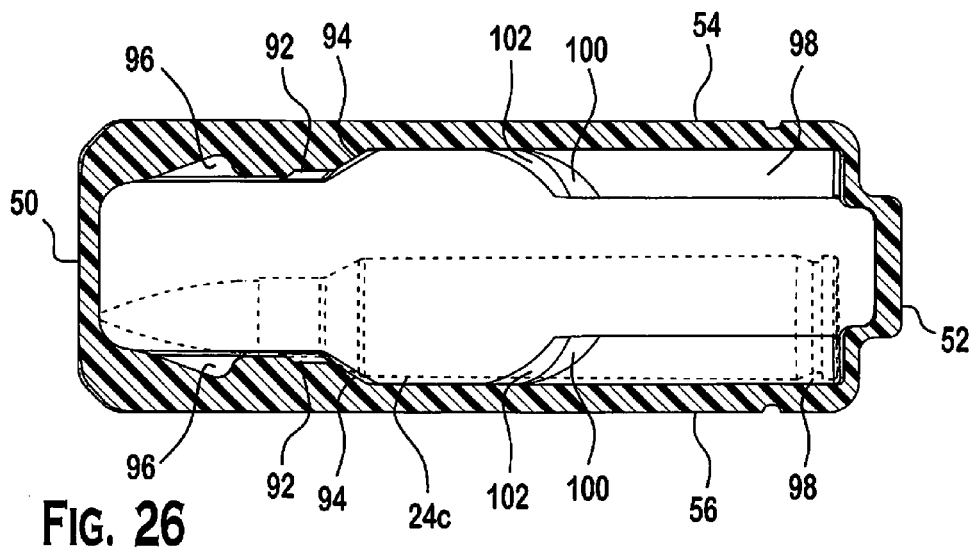
FIG. 26 is a cross-sectional view of the FIG. 23, along line 26-26.
Figure 27:
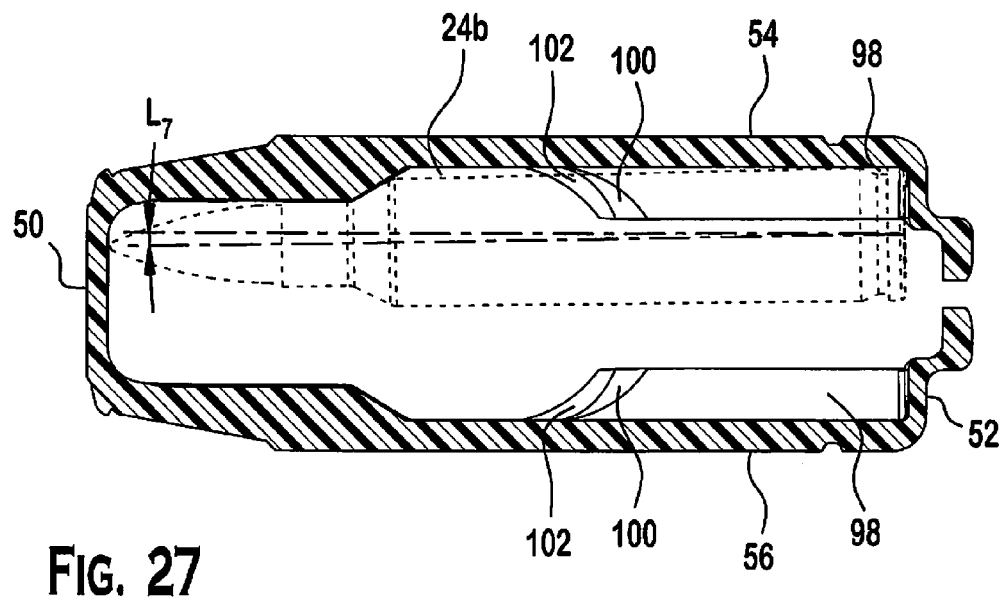
FIG. 27 is a cross-sectional view of the FIG. 23, along line 27-27.
Figure 28:
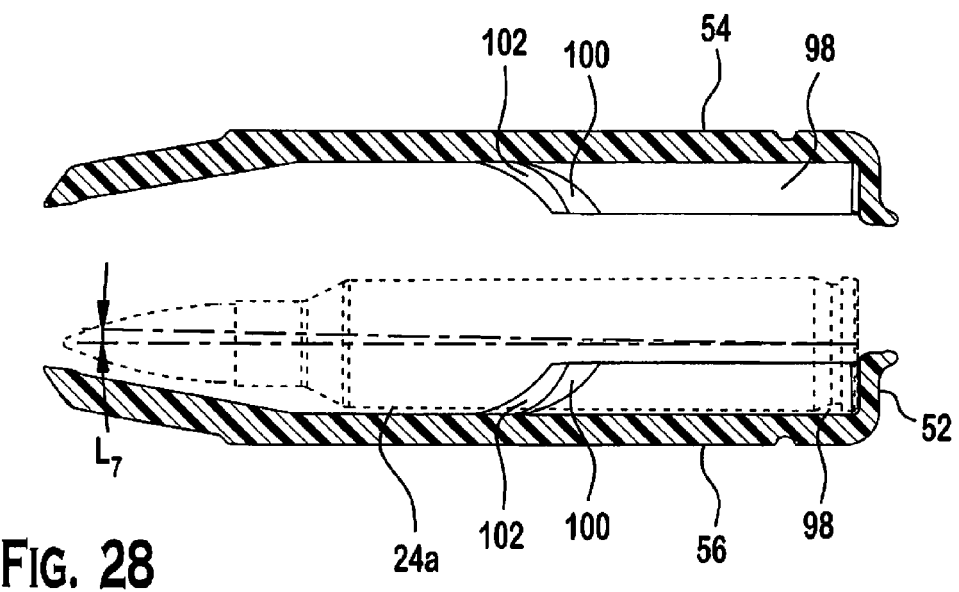
FIG. 28 is a cross-sectional view of the FIG. 23, along line 28-28.
Figure 32:
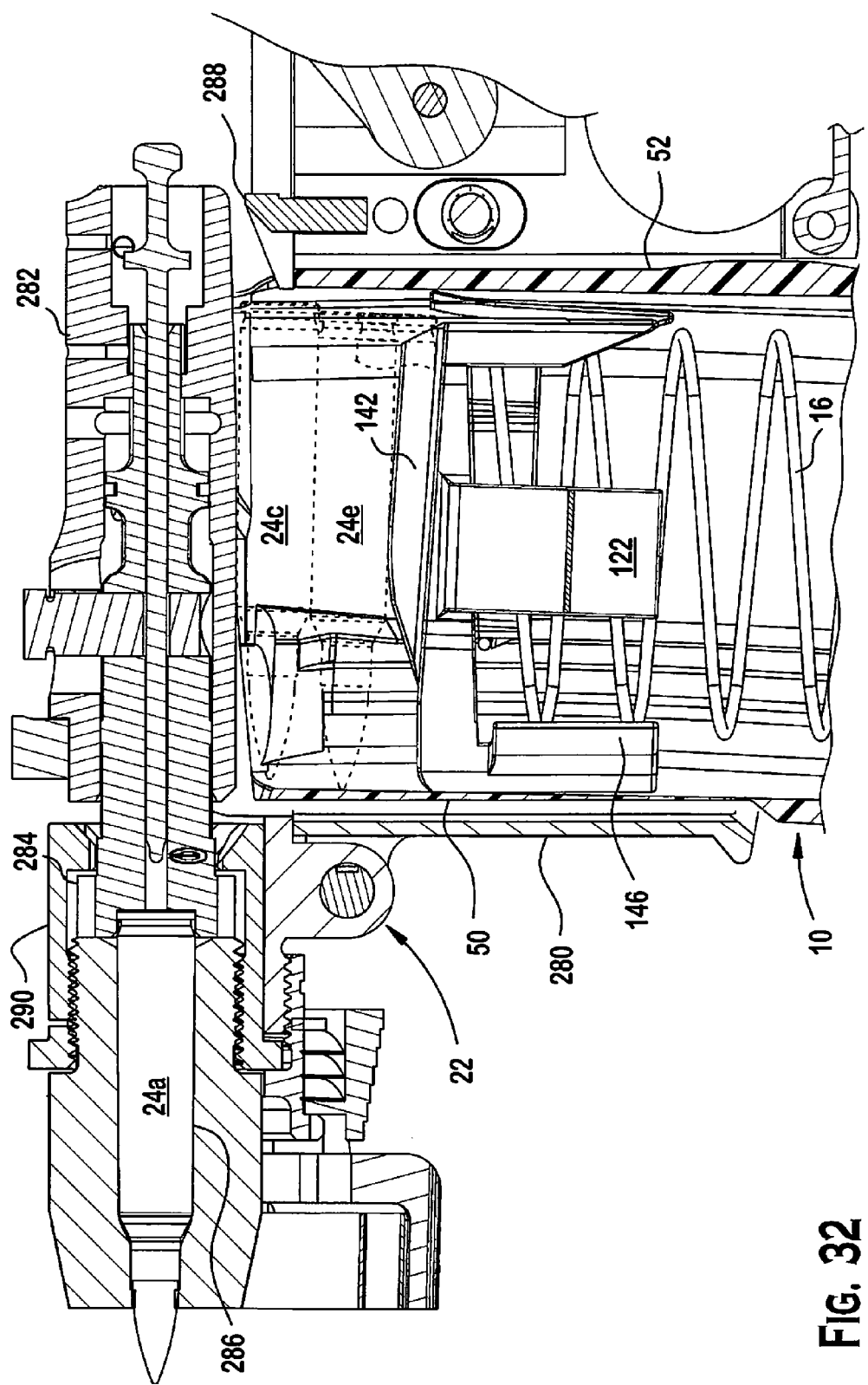
FIG. 32 is a schematic depiction of the effect of the ammunition guide surfaces and multifaceted block on the position of the ammunition cartridges as a bolt carrier of an AR-15 type rifle locks the engaged ammunition cartridge into the chamber of the rifle.
Figure 33:
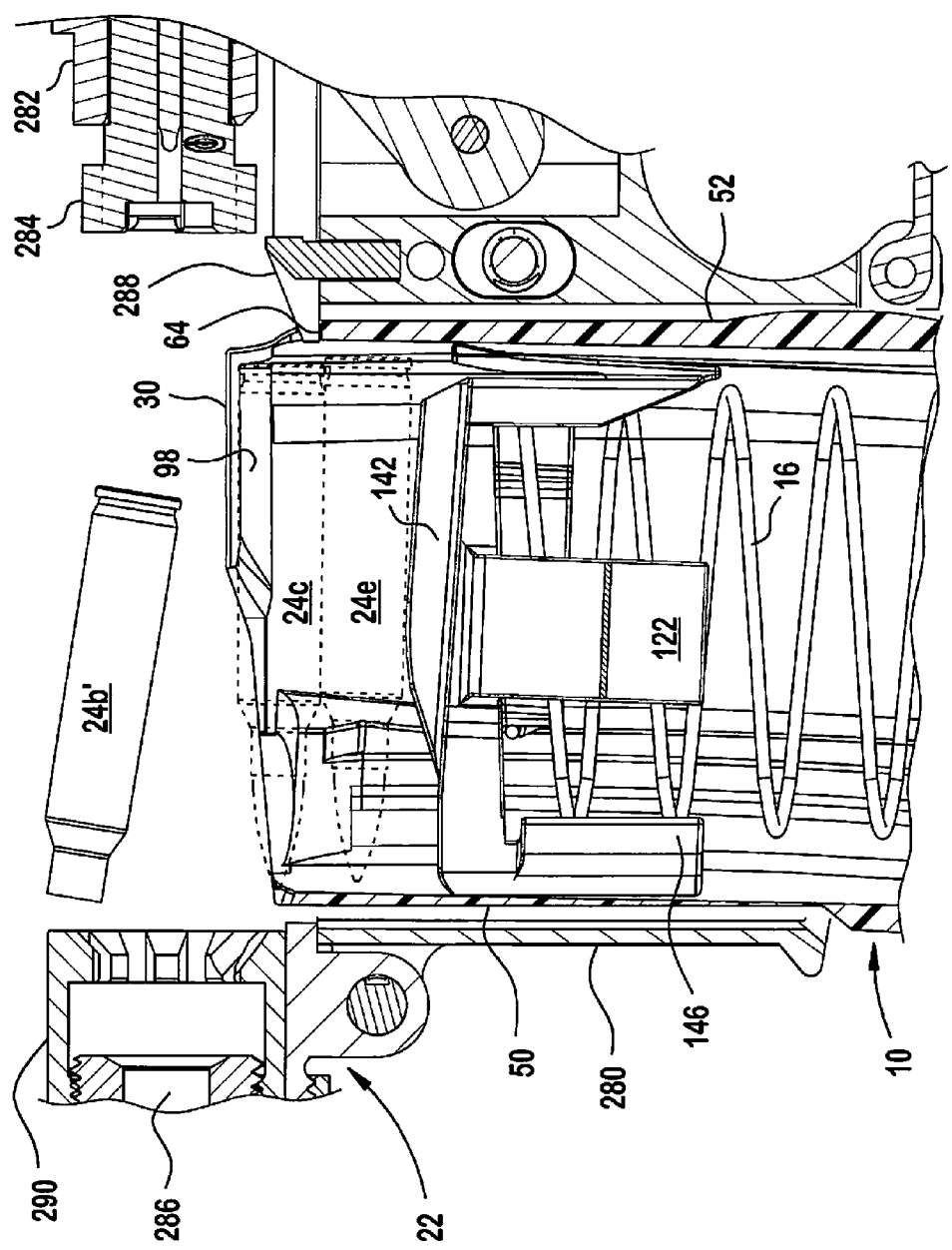
FIG. 33 is a schematic depiction of the effect of the ammunition guide surfaces and multifaceted block on the position of the ammunition cartridges as a bolt carrier of an AR-15 type rifle recoils after firing and cocking the trigger.

As the uppermost ammunition cartridge is transferred from the magazine, the magazine spring pushes the follower upward to position the next ammunition cartridge for feeding (FIG. 32). As each ammunition cartridge advances up the magazine, the ammunition cartridge encounters the angled and tapered rear surface 94 that is configured to push the ammunition cartridges backward (e.g., FIGS. 23, 25 and 29). Shortly thereafter, the ammunition cartridge 24 will encounter the angled subsurface 92, which is configured to push the front of the ammunition cartridge inward (FIGS. 23, 26 and 27). The tip of the ammunition cartridge may move inward by a distance L7 of approximately 1 mm (FIG. 27).

Figure 34:
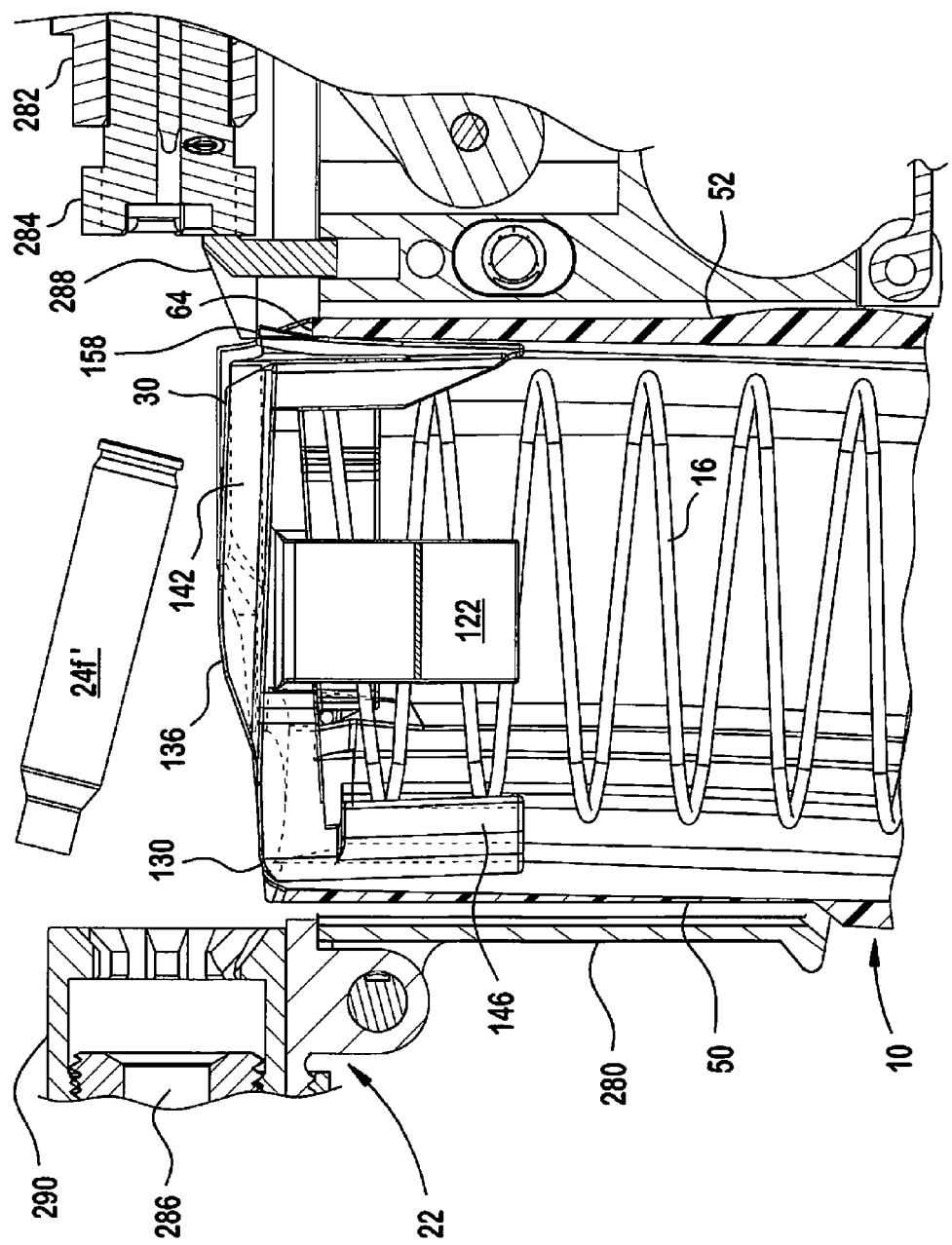
FIG. 34 is a schematic depiction of the interaction between the magazine of FIG. 1 and the AR-15 type rifle, as the tip of the resilient tab on the magazine follower pushes the bolt catch upward to stop forward travel of the bolt carrier.

As the ammunition cartridge 24 rises above the edge of the angled and tapered rear surface 94, the pressure from the multi-faceted block 86 is removed (FIGS. 23 and 28) and the front tip of the ammunition cartridge may shift outward by approximately 1 mm, and settle on top of the tapered concave upper surface 88. Additionally, the ammunition cartridge may shift forward, and move upward and inward under the direction of the tapered concave upper surface 88, adjacent front sidewall of the magazine, and adjacent ammunition cartridges or follower to an improved position for feeding into the barrel extension 290 and chamber 286 (FIGS. 23, 24, 28 and 29). After the final ammunition cartridge in the magazine has been fired 24f, the resilient tab 158 may rise above the rear sill 64 to move the bolt catch 288 in position to block forward travel of the bolt 284 (FIG. 34).

Figure 24:
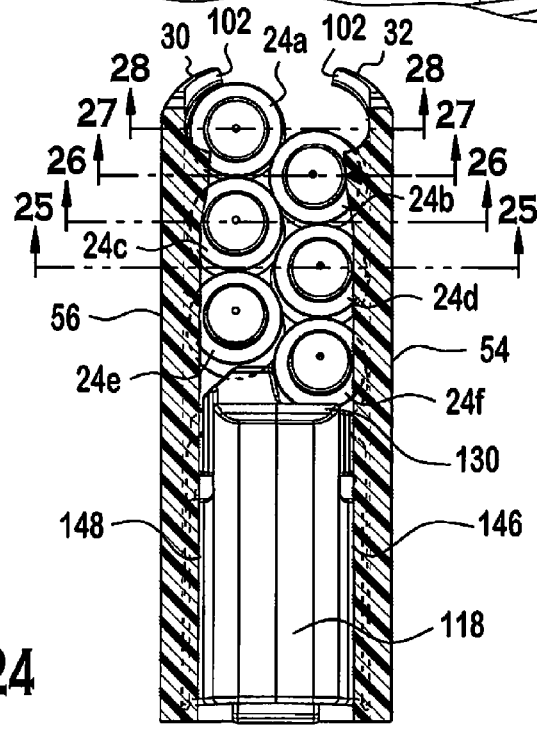
FIG. 24 is a cross-sectional view of the FIG. 23, along line 24-24.
Figure 25:
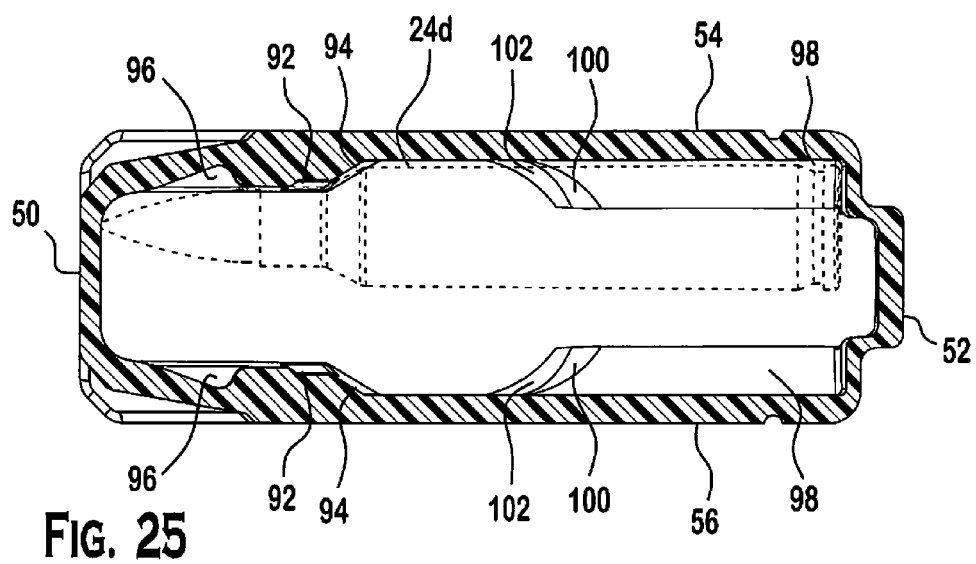
FIG. 25 is a cross-sectional view of the FIG. 23, along line 25-25.

As shown in FIG. 24, the ammunition cartridges 24b, 24c near the uppermost ammunition cartridge 24a may be increasingly compressed between the lower stack of ammunition cartridges and/or the follower 14, the multi-faceted block 86 and the magazine casing side walls 52, 54. Squeezing the ammunition cartridges 24b, 24c, 24d, 24e and 24f in this manner may provide a compact arrangement which forms a stable, secure mass that acts as another guide surface for the uppermost ammunition cartridge 24a. Thus, the compact arrangement of ammunition cartridges may provide a stable bottom guide for the upper most ammunition cartridge. Also, pressure applied on the uppermost ammunition cartridge 24a by the adjacent ammunition cartridges 24b, 24c may help drive the uppermost ammunition cartridge upward as it is pushed forward by the bolt.

A compact, stable, and secure arrangement of ammunition cartridges near the top of the magazine may prevent (or limit) uncontrolled movement or jostling of the ammunition cartridges, which may result from firing recoil, recoil travel of the bolt assembly, or external impacts to the magazine or weapon. This may reduce the likelihood of a misfeed or jamming of the weapon.

The magazine spring of FIG. 22A may facilitate reliable feeding of the ammunition cartridges to the firearm chamber because the relatively stronger spring forces applied to the front of the follower 14 may help the ammunition cartridges smoothly overcome the restriction caused by the multi-faceted block. Relatively stronger spring forces at the front of the follower may compact the nearby ammunition cartridges against the casing side walls to form a more stable and secure mass. Relatively stronger spring forces applied to the front of the follower also may help maintain the front of the follower in a favorable position for traveling through the magazine and feeding the uppermost cartridge to the weapon. Further relatively stronger spring forces applied to the front of the follower may better resist impacts from firing recoil and return travel of the bolt carrier. The resilient follower wings 122, 124 and resilient rear tab 154 may provide a degree of freedom of movement and resistance within the magazine casing to further accommodate impacts and promote proper positioning of the ammunition cartridges for feeding to the firearm.

While it has been illustrated and described what at present are considered to be a preferred embodiment of the present invention, it will be understood by those skilled in the art that various changes and modifications may be made, and equivalents may be substituted for elements thereof without departing from the true scope of the invention. For example, the magazine may be formed with a smaller ammunition capacity or different spring design to accommodate different types of ammunition cartridges. Likewise, the configuration of the magazine casing may be modified for compatibility with other small arms weapons. Additionally, features and/or elements from any embodiment may be used singly or in combination with other embodiments. Therefore, it is intended that this invention not be limited to the particular embodiments disclosed herein, but that the invention include all embodiments falling within the scope and the spirit of the present invention.

What is claimed is:

1. A magazine configured for storing and feeding ammunition cartridges to a weapon comprising:
    a casing which comprises an upper end and a lower end;
    a floor plate situated near the lower end;
    a follower adjacent the floor plate; and
    a magazine spring inside the casing which comprises
        a first end connected to the follower,
        a second end connected to the floor plate, and
        a plurality of coils, each of the plurality of coils including
            a first segment having a first radius,
            a second segment having a first length adjoining the first segment,
            a third segment having a second radius adjoining the second segment, the second radius being greater than the first radius, and
            a fourth segment having a second length adjoining the third segment, the second length being approximately equal to the first length,
    wherein the second radius divided by the first radius defines a coil ratio, and the coil ratio is between approximately 1.1 and approximately 1.5.

2. The magazine of claim 1, wherein the magazine spring is preloaded for a force of approximately 15 N at a reference length of approximately 180 mm.

3. The magazine of claim 2, wherein the magazine spring has a solid height that is less than or equal to approximately 25 mm.

4. The magazine of claim 1, wherein the second radius is approximately 8.1 mm.

5. The magazine of claim 4, wherein the first radius is approximately 6.5 mm.

6. The magazine of claim 5, wherein the magazine spring is formed from a round wire.

7. The magazine of claim 6, wherein the round wire has an outer diameter of approximately 1.5 mm.

8. The magazine of claim 7, wherein the round wire is music wire per ASTM A228.

9. The magazine of claim 1, wherein the magazine spring is preloaded for a force of approximately 15 N at a reference length of approximately 75 mm.

10. The magazine of claim 9, wherein the magazine spring has a solid height less than or equal to approximately 20 mm.

11. The magazine of claim 9, wherein the second radius is approximately 8.1 mm.

12. The magazine of claim 11, wherein the first radius is approximately 6.1 mm.

13. The magazine of claim 12, wherein the magazine spring is formed from a round wire.

14. The magazine of claim 13, wherein the round wire has an outer diameter of approximately 1.5 mm.

15. The magazine of claim 14, wherein the round wire is music wire per ASTM A228.

16. The magazine of claim 1, wherein the casing is configured and dimensioned to store a plurality of ammunition cartridges for a small arms weapon.

17. The magazine of claim 16, wherein the casing is configured and dimensioned to store 30 or fewer ammunition cartridges.

18. The magazine of claim 16, wherein the casing is configured and dimensioned to store 10 or fewer ammunition cartridges.

19. The magazine of claim 16, wherein the casing is configured and dimensioned to store 5.56×45 mm NATO cartridges.

20. The spring of claim 16, wherein the casing is configured and dimensioned to store .223 Remington cartridges.

* * * * *